(12) United States Patent
Chopra et al.

(10) Patent No.: US 11,520,492 B1
(45) Date of Patent: Dec. 6, 2022

(54) METHOD AND SYSTEM FOR MIGRATING DATA CLUSTERS USING HETEROGENEOUS DATA CLUSTER INFRASTRUCTURES

(71) Applicant: EMC IP Holding Company LLC, Hopkinton, MA (US)

(72) Inventors: Shelesh Chopra, Bangalore (IN); Prakash Appayya Acharya, Bangalore (IN); Mohammed Abdul Samad, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 17/386,471

(22) Filed: Jul. 27, 2021

(30) Foreign Application Priority Data

Jun. 11, 2021 (IN) .............................. 202141026171

(51) Int. Cl.
| | |
|---|---|
| *G06F 12/00* | (2006.01) |
| *G06F 3/06* | (2006.01) |
| *G06F 11/14* | (2006.01) |

(52) U.S. Cl.
CPC ............ *G06F 3/0619* (2013.01); *G06F 3/067* (2013.01); *G06F 3/0647* (2013.01); *G06F 11/1451* (2013.01); *G06F 11/1464* (2013.01); *G06F 11/1469* (2013.01)

(58) Field of Classification Search
CPC .... G06F 3/0619; G06F 3/0647; G06F 3/0671; G06F 11/1451; G06F 11/1464; G06F 11/1469
See application file for complete search history.

(56) References Cited

U.S. PATENT DOCUMENTS

| | | |
|---|---|---|
| 9,275,060 B1 | 3/2016 | Supekar |
| 9,600,376 B1 | 3/2017 | Krinke, II et al. |
| 10,893,111 B1 * | 1/2021 | Ezra ................... H04Q 11/0062 |
| 2012/0166395 A1 * | 6/2012 | Kaijima .............. G06F 11/2056 |
| | | 707/655 |
| 2013/0346532 A1 | 12/2013 | D'Amato et al. |

(Continued)

FOREIGN PATENT DOCUMENTS

CN 114153822 A * 3/2022

OTHER PUBLICATIONS

VMware, Inc., Backup and Restore, VMware Validated Design 6.0.1, Aug. 25, 2020.

*Primary Examiner* — John A Lane
(74) *Attorney, Agent, or Firm* — Chamberlain, Hrdlicka, White, Williams & Aughtry

(57) ABSTRACT

Techniques described herein relate to a method for managing data protection services for data clusters. The method includes identifying, by a data protection manager, a migration event associated with a first data cluster; in response to identifying the migration event: identifying a second data cluster capable of hosting the first data cluster using data cluster topology information and data cluster component inventory information associated with the first data cluster; generating a dependency map associated with the second data cluster based on the first data cluster; identifying a migration sequence based on the dependency map; initiating data cluster components of the second data cluster to perform migration of the first data cluster; and migrating the first data cluster to the second data cluster.

20 Claims, 15 Drawing Sheets

(56) References Cited

U.S. PATENT DOCUMENTS

| | | |
|---|---|---|
| 2015/0149423 A1 | 5/2015 | Kiselev et al. |
| 2015/0356161 A1 | 12/2015 | Slavicek et al. |
| 2016/0070487 A1* | 3/2016 | Crawford .............. G06F 3/0647 |
| | | 711/162 |
| 2016/0357736 A1* | 12/2016 | Schuenzel ............. G06F 3/0653 |
| 2017/0026263 A1 | 1/2017 | Gell et al. |
| 2019/0332496 A1 | 10/2019 | Chopra |
| 2020/0033985 A1 | 1/2020 | Abe et al. |
| 2020/0042619 A1 | 2/2020 | Venkataramani et al. |
| 2021/0132846 A1 | 5/2021 | Moldvai et al. |
| 2021/0303164 A1 | 9/2021 | Grunwald et al. |

* cited by examiner

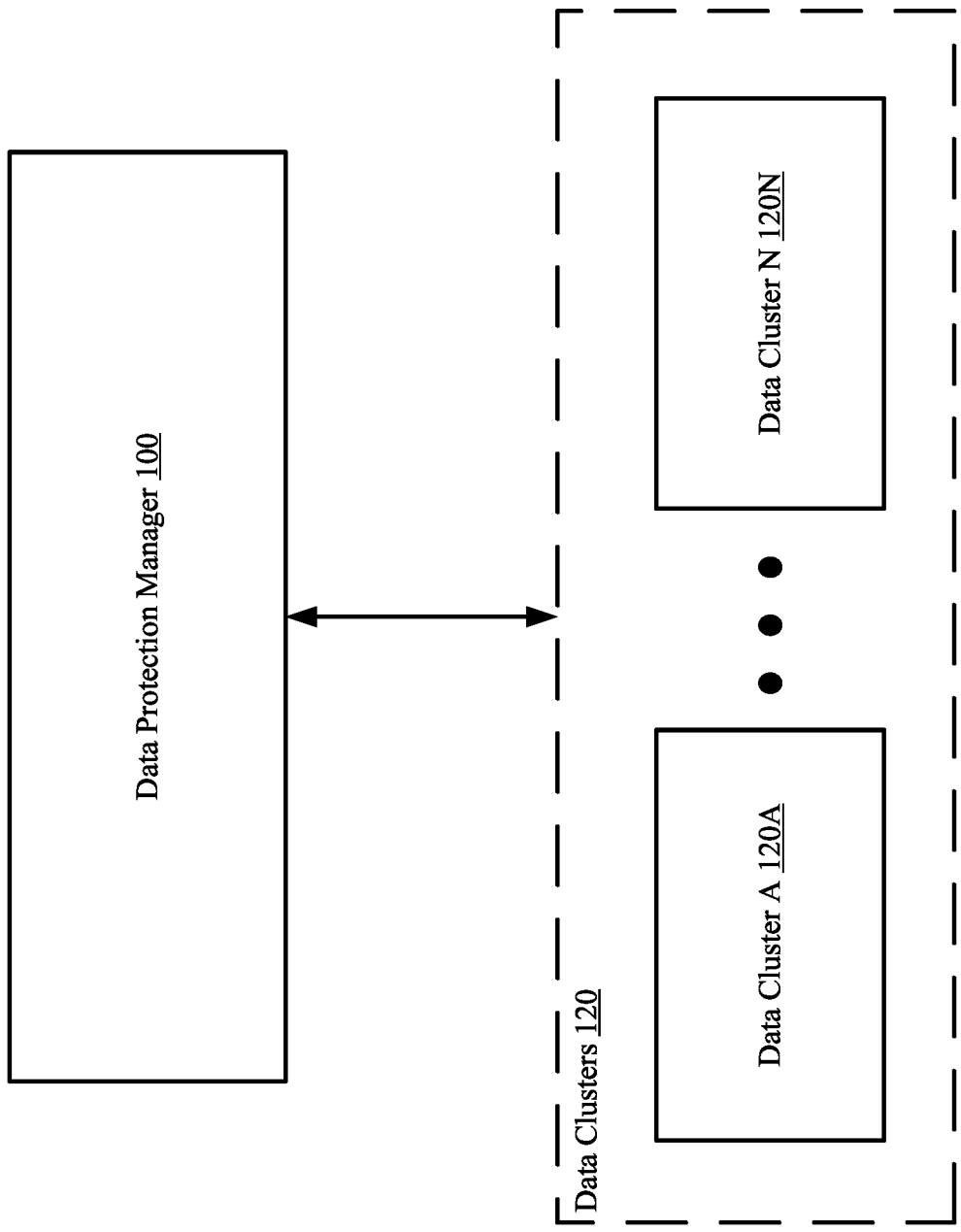

METHOD AND SYSTEM FOR MIGRATING DATA CLUSTERS USING HETEROGENEOUS DATA CLUSTER INFRASTRUCTURES

BACKGROUND

Computing devices may provide services. To provide the services, the computing devices may include hardware components and software components. To provide the aforementioned services, the hardware and software components of the computing devices may generate data. The data may be relevant to users of the computing devices. The data may be protected to ensure availability to users of the computing devices.

SUMMARY

In general, in one aspect, the invention relates to a method for managing data clusters in accordance with one or more embodiments of the invention. The method includes identifying, by a data protection manager, a migration event associated with a first data cluster; in response to identifying the migration event: identifying a second data cluster capable of hosting the first data cluster using data cluster topology information and data cluster component inventory information associated with the first data cluster; generating a dependency map associated with the second data cluster based on the first data cluster; identifying a migration sequence based on the dependency map; initiating data cluster components of the second data cluster to perform migration of the first data cluster; and migrating the first data cluster to the second data cluster.

In general, in one aspect, the invention relates to a system for managing data clusters in accordance with one or more embodiments of the invention. The system includes persistent storage, which stores a data cluster component inventory repository, and a data protection manager. The data protection manager is programmed to identify a migration event associated with a first data cluster; in response to identifying the migration event: identify a second data cluster capable of hosting the first data cluster using data cluster topology information and data cluster component inventory information associated with the first data cluster; generate a dependency map associated with the second data cluster based on the first data cluster; identify a migration sequence based on the dependency map; initiate data cluster components of the second data cluster to perform migration of the first data cluster; and migrate the first data cluster to the second data cluster.

In general, in one aspect, the invention relates to a non-transitory computer readable medium which includes computer readable program code, which when executed by a computer processor enables the computer processor to perform a method for managing data clusters in accordance with one or more embodiments of the invention. The method includes identifying, by a data protection manager, a migration event associated with a first data cluster; in response to identifying the migration event: identifying a second data cluster capable of hosting the first data cluster using data cluster topology information and data cluster component inventory information associated with the first data cluster; generating a dependency map associated with the second data cluster based on the first data cluster; identifying a migration sequence based on the dependency map; initiating data cluster components of the second data cluster to perform migration of the first data cluster; and migrating the first data cluster to the second data cluster.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1A shows a diagram of a system in accordance with one or more embodiments of the invention.

DETAILED DESCRIPTION

Figure 1B:
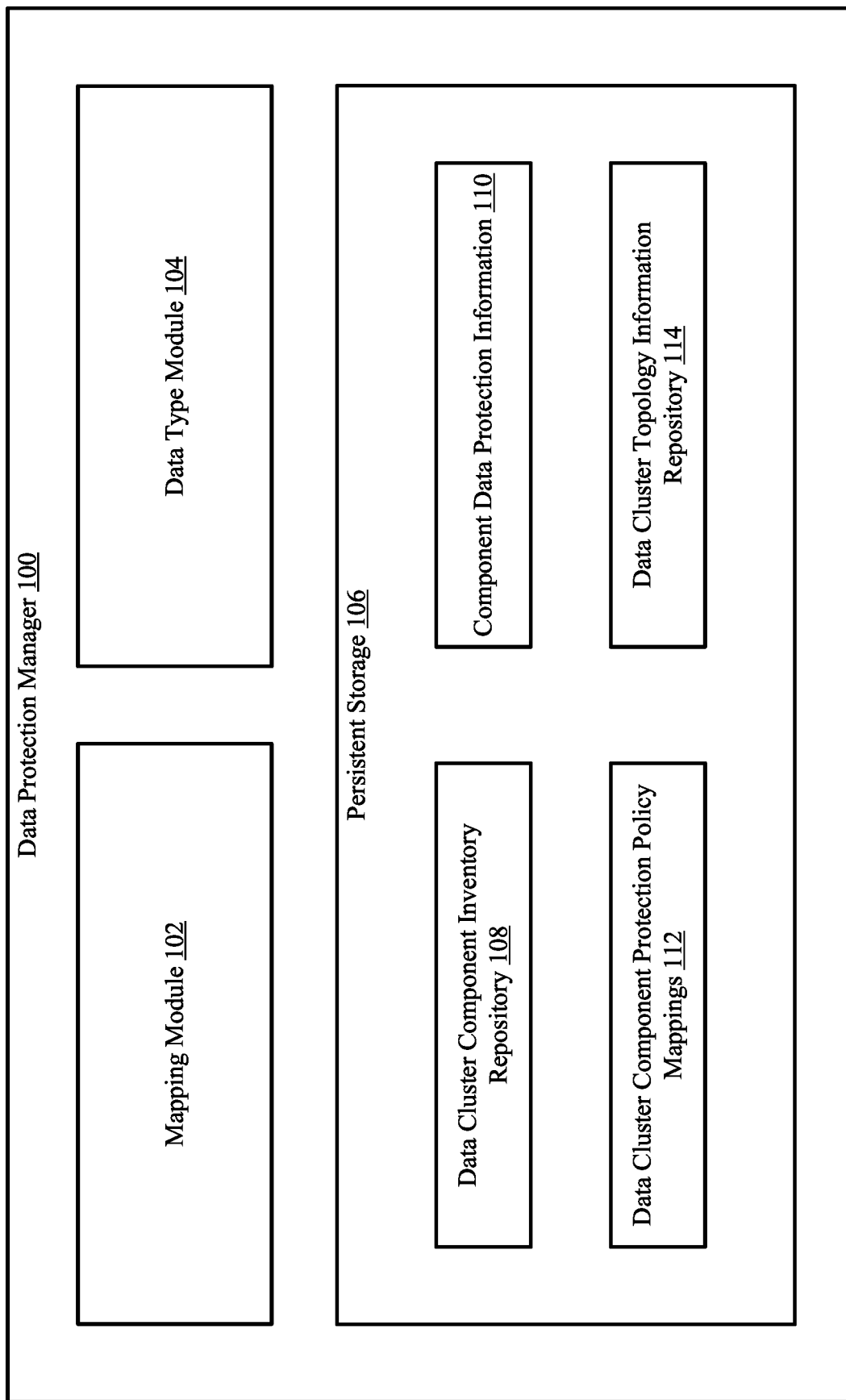
FIG. 1B shows a diagram of a data protection manager in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a system and a method for managing data clusters. More specifically, embodiments of the invention relate to migrating data clusters to other data clusters that include heterogeneous infrastructures.

FIG. 1A shows a diagram of a system in accordance with one or more embodiments of the invention. The system may include a data protection manager (100) and data clusters (120). The system may include any number of data clusters (120) without departing from the invention. For example, the system may include data cluster A (120A) and data cluster N (120N). The system may include additional, fewer, and/or other components without departing from the invention. Each of the components in the system may be operatively connected via any combination of wireless and/or wired networks.

In one or more embodiments of the invention, the data protection manager (100) includes the functionality provide data protection services to the data clusters (120). The data protection manager (100) may include the functionality to provide and/or obtain other and/or additional services without departing from the invention. For additional information regarding the data protection manager (100) refer to FIG. 1B.

Figure 7:
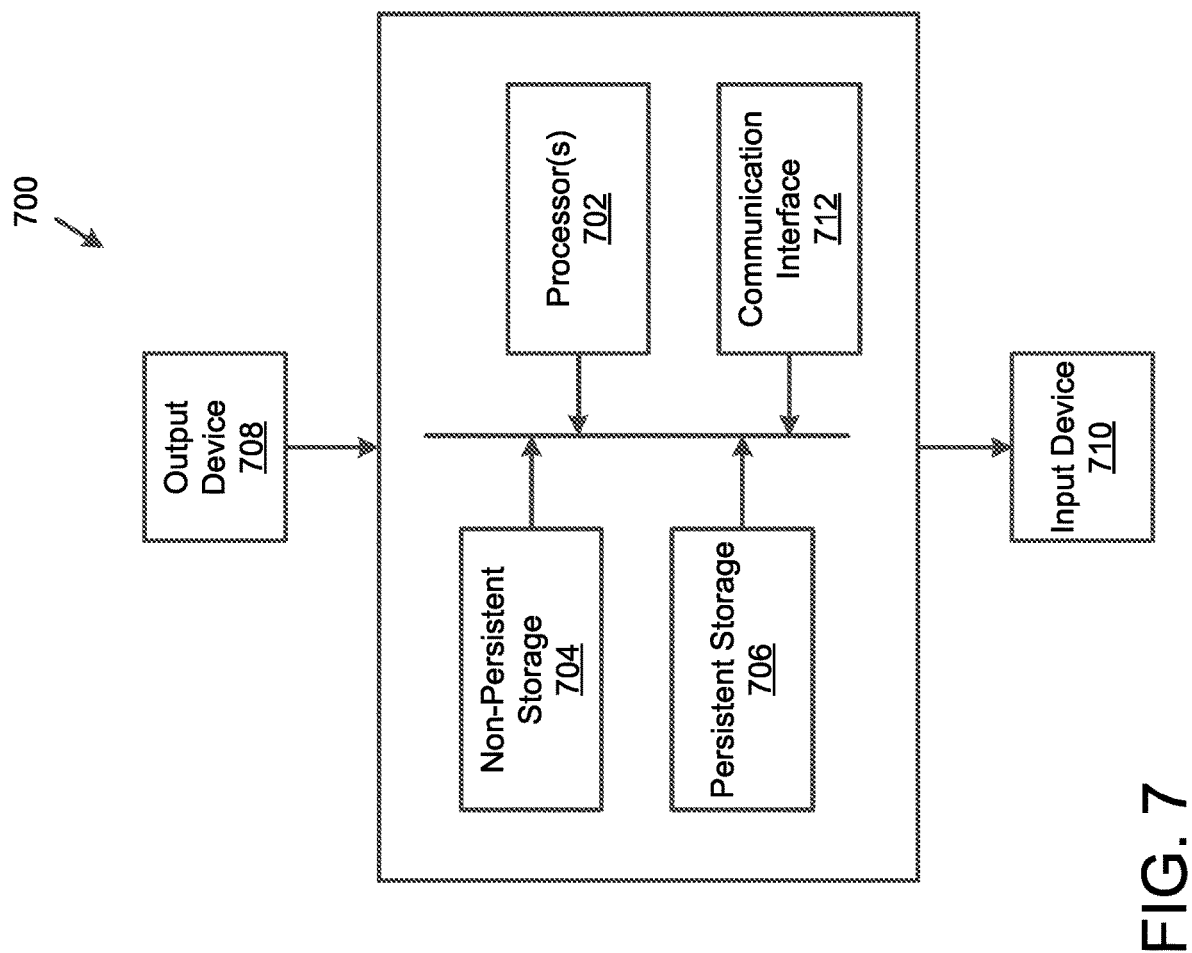
FIG. 7 shows a diagram of a computing device in accordance with one or more embodiments of the invention.

In one or more embodiments of the invention, the data protection manager (100) is implemented as a computing device (see e.g., FIG. 7). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the data protection manager (100) described throughout this application.

In one or more embodiments of the invention, the data protection manager (100) is implemented as a logical device. The logical device may utilize the computing resources of any number of computing devices and thereby provide the functionality of the data protection manager (100) described throughout this application.

In one or more embodiments of the invention, the data clusters (120) include the functionality to obtain data protection services from the data protection manager. The data clusters (120) may further include the functionality to perform computer implemented services for users of the data clusters (e.g., clients, not shown). The computer implemented services may include, for example, database services, electronic mail services, data processing services, etc. The computer implemented services may include other and/or additional types of services without departing from the invention.

In one or more embodiments of the invention, a data cluster (e.g., 120A) of the data clusters may be implemented as one or more computing devices (e.g., see above discussion). A data cluster (e.g., (120A)) may include any number of computing devices without departing from the invention. Each data cluster may include different numbers of computing devices, different quantity and types of computer resources, and may perform different computer implemented services without departing from the invention. For additional information regarding data clusters (120), refer to FIG. 1C.

FIG. 1B shows a diagram of a data protection manager in accordance with one or more embodiments of the invention. The data protection manager may be an embodiment of the data protection manager (100, FIG. 1A) discussed above. As discussed above, the data protection manager may perform data protection services for the data clusters (120, FIG. 1A). To perform the aforementioned data protection services, the data protection manager (100) may include a mapping module (102), a data type module (104), and persistent storage (106). The data protection manager (100) may include other and/or additional components without departing from the invention. Each of the aforementioned components of the data protection manager is discussed below.

In one or more embodiments of the invention, the mapping module (102) includes the functionality to perform a portion of the data protection services of the data protection manager (100). The portion of the data protection services performed by the mapping module (102) may include the methods depicted in FIGS. 2A-2B. The mapping module (102) may include the functionality to perform and or obtain other and/or additional services without departing from the invention.

In one or more embodiments of the invention, the mapping module (102) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the mapping module (102) described throughout this application.

In one or more embodiments of the invention, the mapping module (102) is implemented as computer instructions, e.g., computer code, stored on a persistent storage that when executed by a processor of the data protection manager (100) causes the data protection manager (100) to provide the functionality of the mapping module (102) described throughout this application.

In one or more embodiments of the invention, the data type module (104) includes the functionality to perform a portion of the data protection services of the data protection manager (100). The portion of the data protection services performed by the data type module (104) may include the methods depicted in FIGS. 2C-2E. The data type module (104) may include the functionality to perform and or obtain other and/or additional services without departing from the invention.

In one or more embodiments of the invention, the data type module (104) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the data type module (104) described throughout this application.

In one or more embodiments of the invention, the data type module (104) is implemented as computer instructions, e.g., computer code, stored on a persistent storage that when executed by a processor of the data protection manager (100) causes the data protection manager (100) to provide the functionality of the data type module (104) described throughout this application.

In one or more embodiments of the invention, the persistent storage (106) stores data. The persistent storage (106) may include a data cluster component inventory repository (108), component data protection information (110), data cluster component protection policy mappings (112) and a data cluster topology information repository (114). The persistent storage (106) may store other and/or additional data without departing from the invention. Each of the aforementioned types of data stored in the persistent storage (106) is discussed below.

The data cluster component inventory repository (108) may include one or more data structures that may include data cluster component inventory information associated with each data cluster that may be used specify the data cluster components deployed in each of the data clusters (120, FIG. 1A). The data cluster component inventory information may include data cluster component identifiers and data cluster component types associated with each data cluster component identifier. The data cluster component inventory repository (108) may include dependency information, data types (e.g., image data, file data, database data, etc.), and data change rates (i.e., the amount of data change per unit of time). The data cluster component inventory information may include other and/or additional types of information without departing from the invention.

The component data protection information (110) may be one or more data structures that include data cluster component types and data protection requirements and data type requirements associated with each data cluster component type. The data protection requirements associated with each data cluster component type may be specified by manufacturer information obtained directly from a manufacturer of a data cluster component and/or configured by a user of the data protection manager (100). The data protection requirements may specify requirements for performing data protection services for data cluster components. The data protection requirements may include, for example, recovery point objectives, target storages for storing backups, backup schedules, and retention periods (i.e., amount of time before a backup is removed from a storage). The data protection requirements may include other and/or additional requirements associated with the performance of data protection services for data cluster component without departing from the invention. The component data protection information (110) may also include backup metadata associated with each data cluster component of the data clusters (120, FIG. 1A). The backup metadata may include information regarding the performance of past data protection services associated with the data cluster components. Such information may include, for example, backup data sizes, change information, etc. The component data protection information (110) may include other and/or additional types of information without departing from the invention.

The data cluster component protection policy mappings (112) may include one or more data structures that specify the protection policy type mappings and backup type mappings associated with each data cluster component of the data clusters (120, FIG. 1A). The data cluster component protection policy mappings (112) may include other and/or additional types of information without departing from the invention.

The data cluster topology information repository (114) may be one or more data structures that include data cluster topology information associated with each of the data clusters (120, FIG. 1A). The data cluster topology information may include, for example, the computing resources (e.g., GPUs, CPUs, storage devices, etc.) associated with each of the data clusters (120, FIG. 1A), computing resource utilization associated with each of the data clusters, etc. The data cluster topology information repository may include other and/or additional types of information without departing from the invention.

The persistent storage (106) may be implemented using physical storage devices and/or logical storage devices. The physical storage devices may include any combination of hard disk drives, solid state disk drives, tape drives, and/or any other physical storage mediums for the storage of data.

The logical storage devices (e.g., virtualized storage) may utilize any quantity of hardware storage resources of any number of computing devices for storing data. For example, the persistent storage (106) may utilize portions of any combination of hard disk drives, solid state disk drives, tape drives, and/or any other physical storage medium of any number of computing devices.

Figure 1C:
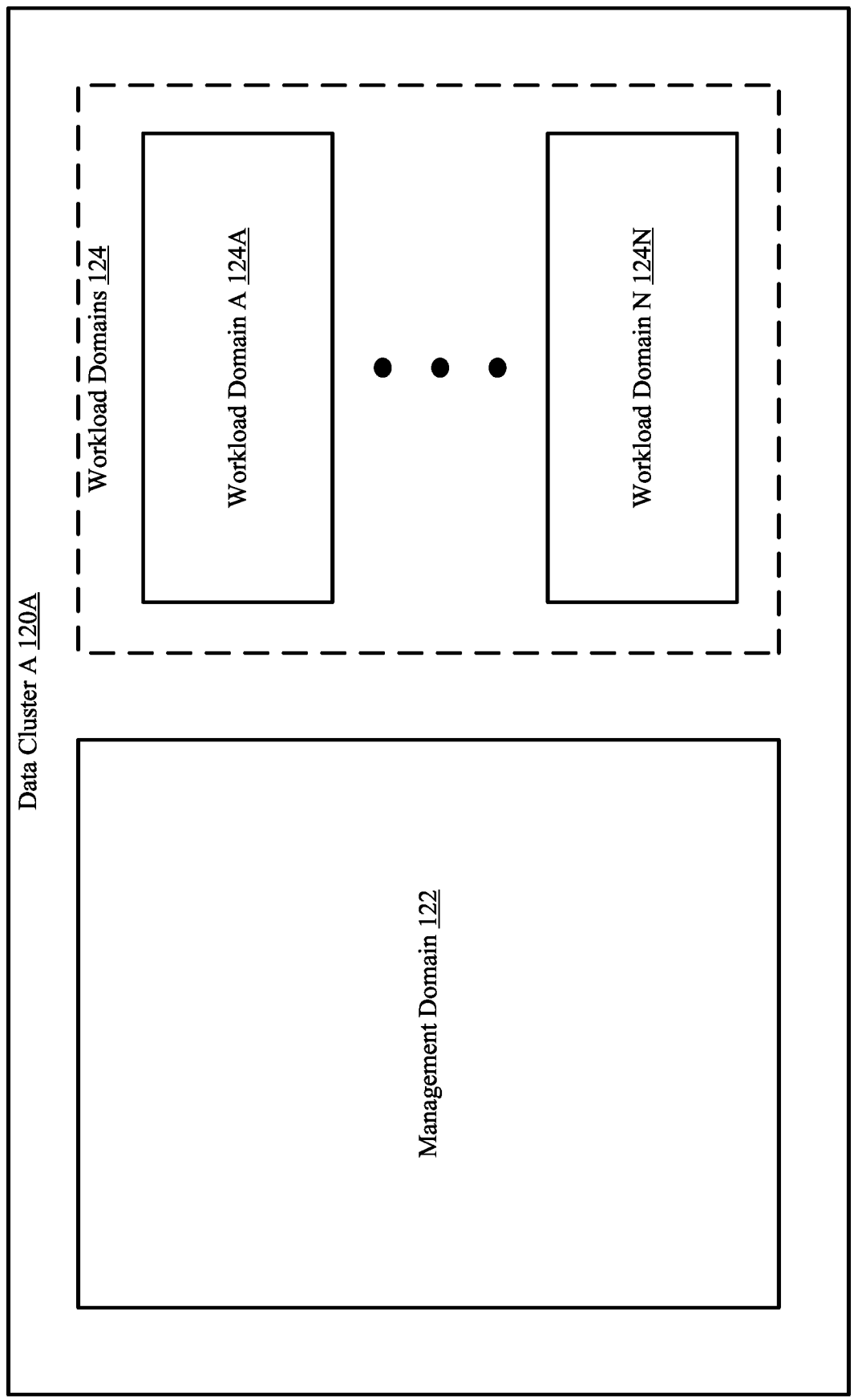
FIG. 1C shows a diagram of a data cluster in accordance with one or more embodiments of the invention.

FIG. 1C shows a diagram of a data cluster in accordance with one or more embodiments of the invention. The data cluster may be an embodiment of a data cluster (e.g., 120A, FIG. 1A) of the data clusters (120, FIG. 1A) discussed above. As discussed above, data cluster A (120A) may include the functionality to perform computer implemented services and obtain data protection services from the data protection manager (100, FIG. 1A). To obtain and perform the aforementioned services, data cluster A (120A) may include a management domain (122) and workload domains (124). Data cluster A (120A) may include any number of workload domains without departing from the invention. For example, data cluster A (120A) may include workload domain A (124A) and workload domain N (124N).

In one or more embodiments of the invention, the management domain (122) provides management services for data cluster A (120A). The management services may include generating information associated with data cluster A (120A) as a result of obtaining data protection services. The management domain (122) may perform and/or obtain other and/or additional services without departing from the invention. For additional information regarding the management domain (122) refer to FIG. 1D.

In one or more embodiments of the invention, the workload domains (124) obtain management services from the management domain (122), data protection services from the data protection manager (100, FIG. 1A), and perform computer implemented services for users. The workload domains (124) may perform and/or obtain other and/or additional services without departing from the invention. For additional information regarding the workload domains (124), refer to FIG. 1E.

Figure 1D:
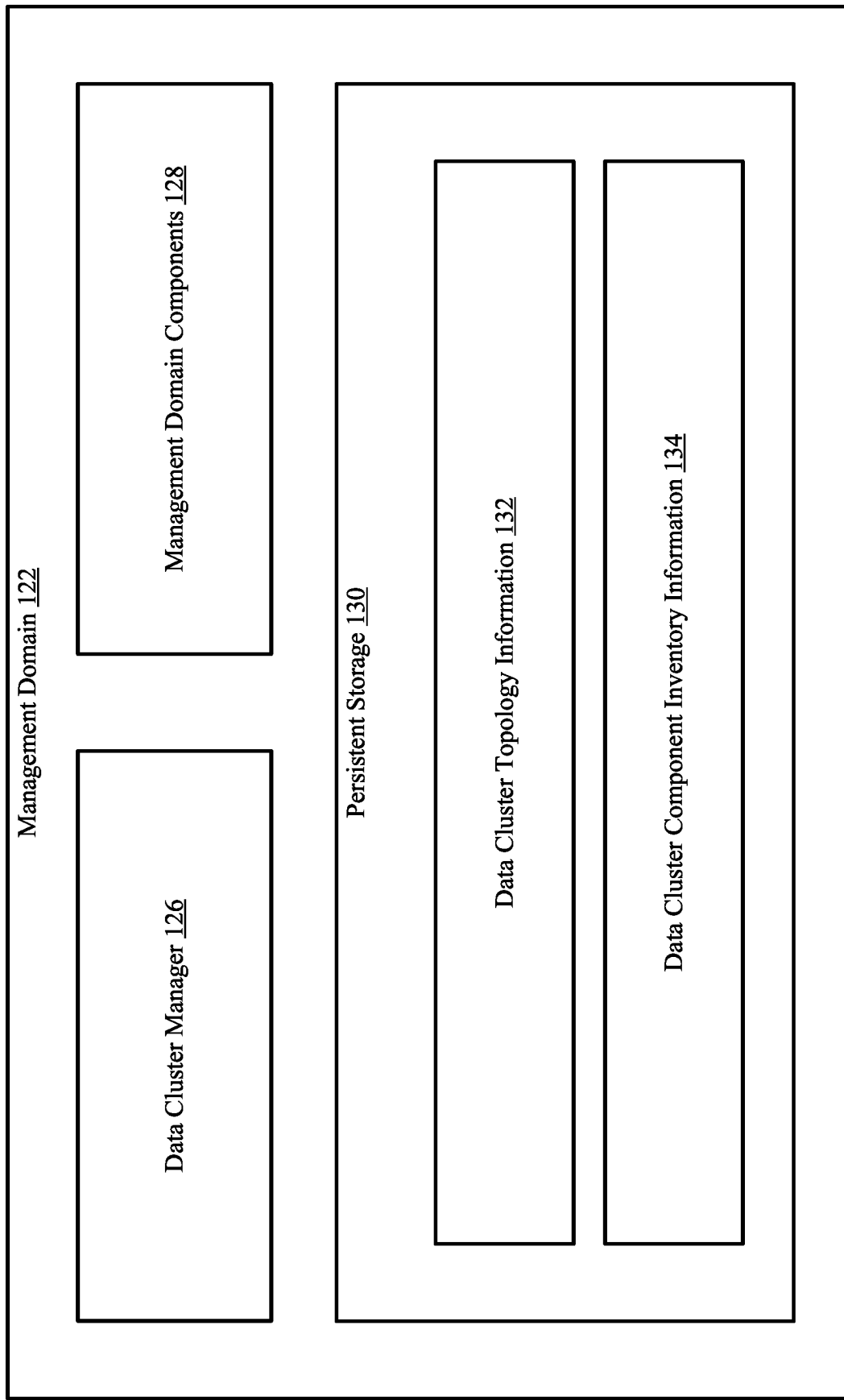
FIG. 1D shows a diagram of a management domain of a data cluster in accordance with one or more embodiments of the invention.

FIG. 1D shows a diagram of a management domain of a data cluster in accordance with one or more embodiments of the invention. The management domain (122) may be an embodiment of the management domain (122, FIG. 1C) discussed above. As discussed above, the management domain (122) provides management services for the workload domains (124, FIG. 1C). To perform the management services, the management domain (122) may include a data cluster manager (126), management domain components (128), and persistent storage (130). The management domain (122) may include other and/or additional components without departing from the invention.

In one or more embodiments of the invention, the data cluster manager (126) includes the functionality to perform the management services discussed above. The data cluster manager (126) may perform and/or provide other and/or additional services without departing from the invention.

In one or more embodiments of the invention, the data cluster manager (126) is implemented as a computing device (discussed above).

In one or more embodiments of the invention, the data cluster manager (126) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the data cluster manager (126) described throughout this application.

In one or more embodiments of the invention, the data cluster manager (126) is implemented as computer instructions, e.g., computer code, stored on a persistent storage that when executed by a processor of data cluster A (120A) causes data cluster A (120A) to provide the functionality of the data cluster manager (126) described throughout this application.

In one or more embodiments of the invention, the management domain components (128) include hardware and software components of the one or more computing devices associated with data cluster A (120A, FIG. 1A) associated with the management domain (122). The hardware components may include, for example, central processing units, graphical processing units, storage devices, etc. The hardware components may include other and/or additional hardware components of computing devices without departing from the invention. The software components may include, for example, virtual machines, applications, operating systems, etc. The software components may include other and/or additional types of software components of computing devices without departing from the invention. The management domain components (128) may include a portion of the data cluster components of data cluster A (120A).

The persistent storage (130) may be an embodiment of the persistent storage (106, FIG. 1B) discussed above. The persistent storage (130) may store data cluster topology information (132) and data cluster component inventory information (134). Each of the aforementioned components of the persistent storage (130) is discussed below.

The data cluster topology information (132) may be an embodiment of the data cluster topology information associated with data cluster A (120A) discussed above with respect to the data cluster topology information repository (114, FIG. 1B).

The data cluster component inventory information (134) may be an embodiment of the data cluster component inventory information associated with data cluster A (120A) discussed above with respect to the data cluster component inventory repository (108, FIG. 1B).

Figure 1E:
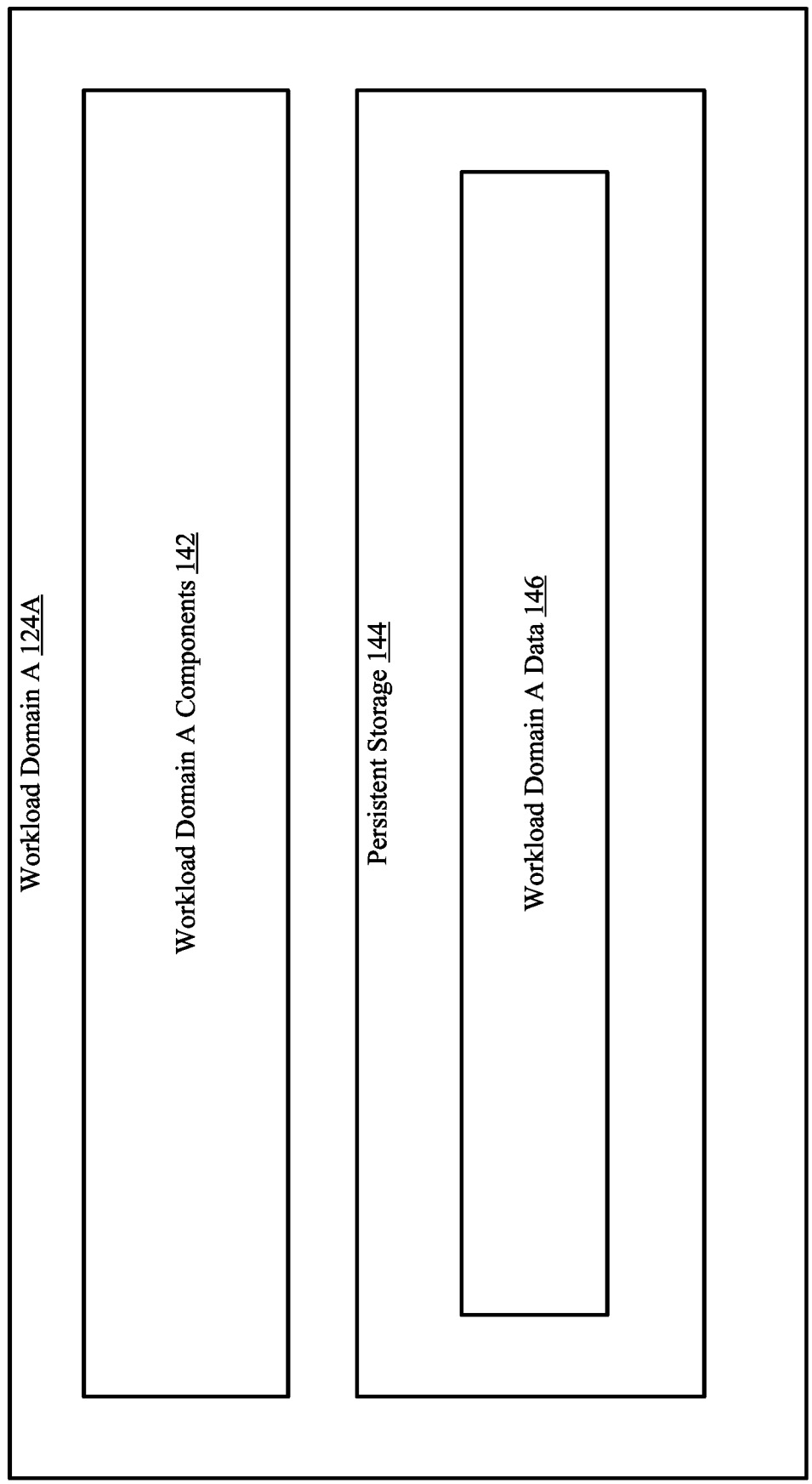
FIG. 1E shows a diagram of a workload domain of a data cluster in accordance with one or more embodiments of the invention.

FIG. 1E shows a diagram of a workload domain of a data cluster in accordance with one or more embodiments of the invention. Workload domain A (124A) may be an embodiment of a workload domain (e.g., 124A, FIG. 1C) discussed above. As discussed above, workload domain A (124) obtains management services and data protection services and provides computer implemented services for users. To perform and obtain the aforementioned services, workload domain A (124A) may include workload domain A components (142), and a persistent storage (144). Workload domain A (124A) may include other and/or additional components without departing from the invention.

In one or more embodiments of the invention, the workload domain A components (142) include hardware and software components of the one or more computing devices associated with data cluster A (120A, FIG. 1A) associated with workload domain A (124A). The hardware components may include, for example, central processing units, graphical processing units, storage devices, etc. The hardware components may include other and/or additional hardware components of computing devices without departing from the invention. The software components may include, for example, virtual machines, applications, operating systems, etc. The software components may include other and/or additional types of software components of computing devices without departing from the invention. The workload domain A components (142) may include a portion of the data cluster components of data cluster A (120A).

The persistent storage (144) may be an embodiment of the persistent storage (106, FIG. 1B) discussed above. The persistent storage (144) may store workload domain A data (146). The workload domain A data (146) may include data generated and used during the performance of computer implemented services by workload domain A (124A). The workload domain A data (146) may include, for example, database data, instant messaging data, machine learning training data, etc. The workload domain A data (146) may include other and/or additional types of data without departing from the invention.

Figure 2A:
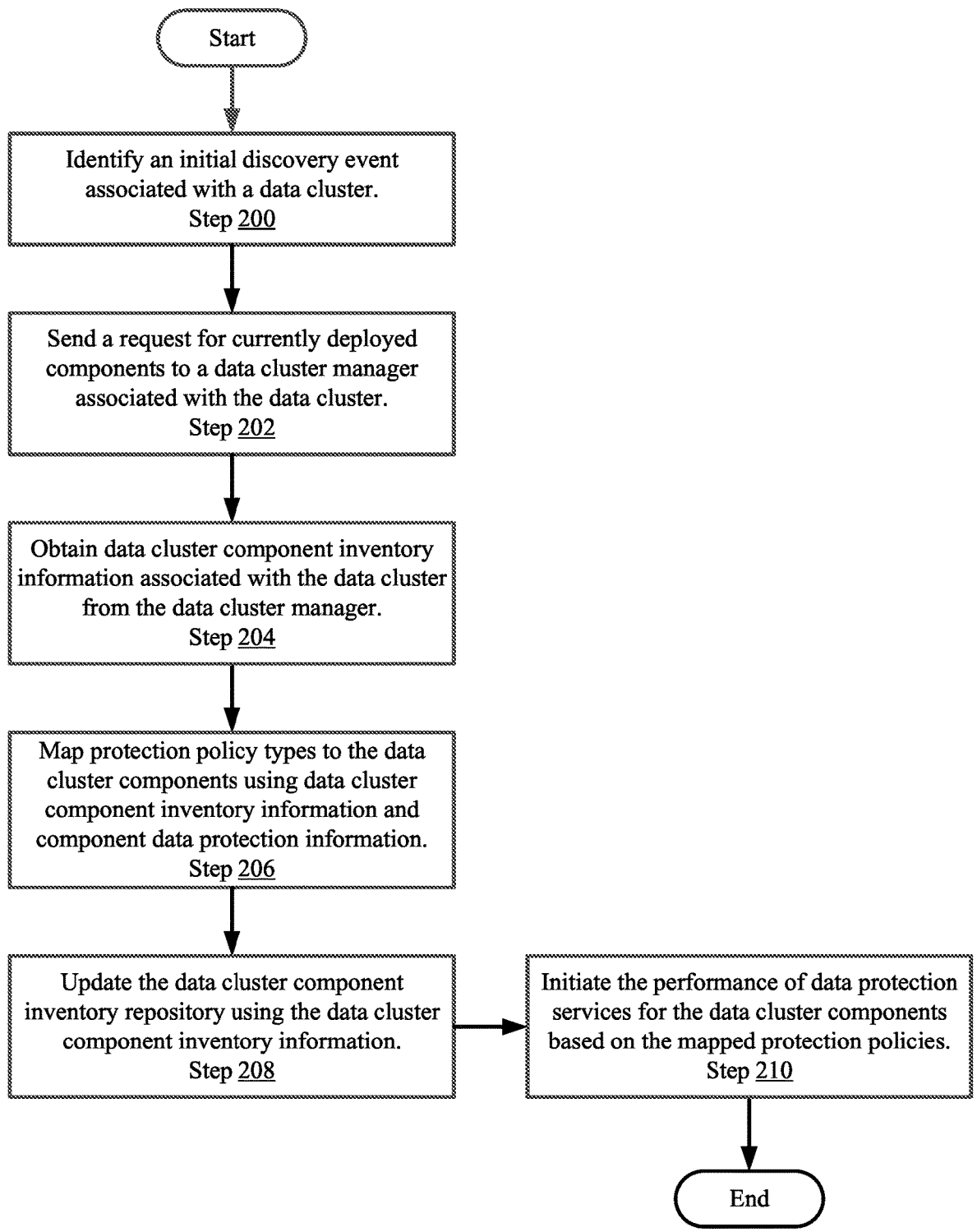
FIG. 2A shows a flowchart of a method for mapping protection policies to data cluster components in accordance with one or more embodiments of the invention.

FIG. 2A shows a flowchart of a method for mapping protection policies to data cluster components in accordance with one or more embodiments of the invention. The method may be performed by, for example, a mapping module (102, FIG. 1B) of a data protection manager (100, FIG. 1A). Other components of the system illustrated in FIGS. 1A-1E may perform all, or a portion, of the method of FIG. 2A without departing from the invention.

While FIG. 2A is illustrated as a series of steps, any of the steps may be omitted, performed in a different order, additional steps may be included, and/or any or all of the steps may be performed in a parallel and/or partially overlapping manner without departing from the invention.

In step 200, an initial discovery event associated with a data cluster is identified.

In one or more embodiments of the invention, a user of the data cluster and/or the data protection manager sends a message to the mapping module of the data protection manager. The message may include a request to perform a data cluster discovery. The message may include communication information. The communication information may include a data cluster identifier, a data cluster manager identifier, a data cluster manager network address, an SFTP server identifier, an SFTP server network address, and security information (e.g., security keys, encryption keys, etc.). The communication information may include other and/or additional information that may be used to communicate with the data cluster and the data cluster manager of the data cluster associated with the initial discovery event without departing from the invention. The message may include other and/or additional information without departing from the invention. The message may be transmitted to the mapping module using any appropriate method of data transmission (e.g., network packets, application programming interface (API) calls, etc.) without departing from the invention. The mapping module of the data protection manager may identify obtaining the request to perform a data cluster discovery as the initial discovery event. The initial discovery event associated with the data cluster may be identified via other and/or additional methods without departing from the invention.

In one or more embodiments of the invention, a data cluster manager of a data cluster sends a message to the mapping module of the data protection manager. The message may include a request to register the data cluster with the data protection manager. The message may include communication information. The communication information may include a data cluster identifier, a data cluster manager identifier, a data cluster manager network address, an SFTP server identifier, an SFTP server network address, and security information (e.g., a security key, an encryption key, etc.). The communication information may include other and/or additional information that may be used to communicate with the data cluster and the data cluster manager of the data cluster associated with the initial discovery event without departing from the invention. The message may include other and/or additional information without departing from the invention. The message may be transmitted to the mapping module using any appropriate method of data transmission (e.g., network packets, application programming interface (API) calls, etc.) without departing from the invention. The mapping module of the data protection manager may identify obtaining the registration request as the initial discovery event. The initial discovery event associated with the data cluster may be identified via other and/or additional methods without departing from the invention.

In step 202, a request for currently deployed components is sent to a data cluster manager associated with the data cluster.

In one or more embodiments of the invention, the mapping module of the data protection manager sends a message to the data cluster manager of the data cluster associated with the initial discovery event. The message may include a request for currently deployed components of the data cluster that require data protection. The message may be sent using the communication information obtained in step 200. The message may include other and/or additional information without departing from the invention. The message may be transmitted to the mapping module using any appropriate method of data transmission (e.g., network packets, application programming interface (API) calls, etc.) without departing from the invention. The request for currently deployed component may be sent to the data cluster manager associated with the data cluster via other and/or additional methods without departing from the invention.

The data cluster may include one or more components that are not discoverable by the data cluster manager. In such scenarios, in one or more embodiments of the invention, the mapping module sends a message to a user of the data cluster. The message may include a request for currently deployed components of the data cluster that may not be discoverable by the data cluster manager that require data protection. The message may be sent using the communication information obtained in step 200. The message may include other and/or additional information without departing from the invention. The message may be transmitted to the user using any appropriate method of data transmission (e.g., network packets, application programming interface (API) calls, etc.) without departing from the invention.

In step 204, data cluster component inventory information associated with the data cluster is obtained from the data cluster manager.

In one or more embodiments of the invention, the mapping module obtains a message from the data cluster manager of the data cluster. The message may include data cluster component inventory information associated with the data cluster. The message may include other and/or additional information without departing from the invention. In response to obtaining the request of step 202, the data cluster manager may generate and/or obtain the data cluster component inventory information. The data cluster component inventory information may be associated with each data cluster component that is discoverable by the data cluster manager. The message may be transmitted to the mapping module using any appropriate method of data transmission (e.g., network packets, application programming interface (API) calls, etc.) without departing from the invention. The data cluster component inventory information associated with the data cluster may be obtained from the data cluster manager via other and/or additional methods without departing from the invention.

As discussed above, the data cluster may include one or more components that may not be discoverable by the data cluster manager. In such scenarios, in one or more embodiments of the invention, the mapping module obtains a message from the user of the data cluster and/or the data protection manager. The message may include data cluster component inventory information associated with the data cluster. The message may include other and/or additional information without departing from the invention. In response to obtaining the request of step 202, the user may generate and/or obtain the data cluster component inventory information. The data cluster component inventory information may be associated with each data cluster component that is not discoverable by the data cluster manager. The message may be transmitted to the mapping module using any appropriate method of data transmission (e.g., network packets, application programming interface (API) calls, etc.) without departing from the invention. The data cluster component inventory information associated with the data cluster may be obtained from the user via other and/or additional methods without departing from the invention.

In step 206, protection policy types are mapped to the data cluster components using data cluster component inventory information and component data protection information.

In one or more embodiments of the invention, the mapping module uses the data cluster component inventory and the component data protection information associated with the data cluster components to map protection policy types to each data cluster component of the data cluster specified by the data cluster component inventory information. The data cluster component inventory information may include a component identifier and a component type associated with each data cluster component currently deployed in the data cluster. For each data cluster component, the mapping module may identify a portion of the component data protection information associated with the component type of the data cluster component. The component data protection information may specify data protection requirements associated with each data cluster component type. The component data protection information may also include the protection policy types that may be mapped to the data cluster components.

The mapping module may compare the data protection requirements of the data cluster component specified by the component data protection information with the data protection requirements specified by each protection policy type. The mapping module may map the protection policy type of the protection policy types that meets the data protection requirements associated with data cluster component by associating the data cluster component identifier with the protection policy type. The protection policy types may be mapped to the data cluster components using data cluster component inventory information and component data protection information via other and/or additional methods without departing from the invention.

In step 208, the data cluster component inventory repository is updated using the data cluster component inventory information.

In one or more embodiments of the invention, the mapping module updates the data cluster component inventory repository using the data cluster component inventory information by generating a data cluster component inventory repository entry associated with the data cluster. The mapping module may include the data cluster identifier and the data cluster component inventory information associated with each data cluster component obtained in step 204 in the entry. The mapping module may also include the protection policy type mappings associated with each data cluster component in the entry and in the data cluster component protection policy mappings. The mapping module may include other and/or additional information associated with the data cluster components of the data cluster in the entry without departing from the invention. The data cluster component inventory repository may be updated using the data cluster component inventory information via other and/or additional methods without departing from the invention.

In step 210, the performance of data protection services for the data cluster components is initiated based on the mapped protection policy types.

In one or more embodiments of the invention, the mapping module initiates the performance of data protection services for the data cluster components using the mapped protection policy types. As discussed above, the protection policy types may include protection policies that specify data protection requirements associated with the data cluster components. The mapping module may initiate the performance of data protection services for each data cluster component that satisfy the data protection requirements of each data cluster component specified by each mapped protection policy type. The data protection services may include generating backups of data cluster components according to a schedule specified by the mapped protection policy types, storing backups in storage locations specified by the mapped protection policy types, and other and/or additional data protection services that satisfy data protection requirements specified by the mapped protection policy types without departing from the invention. The mapping module may initiate the performance of the data protection services by requesting the data protection manager to monitor the protection policy types mapped to each data cluster component of the data cluster and to perform the data protection services specified by the mapped protection policy types. As a result, the data protection manager may perform the data protection services. The performance of data protection services for the data cluster components may be initiated based on the mapped protection policy types via other and/or additional methods without departing from the invention.

In one or more embodiments of the invention, the method ends following step 210.

Figure 2B:
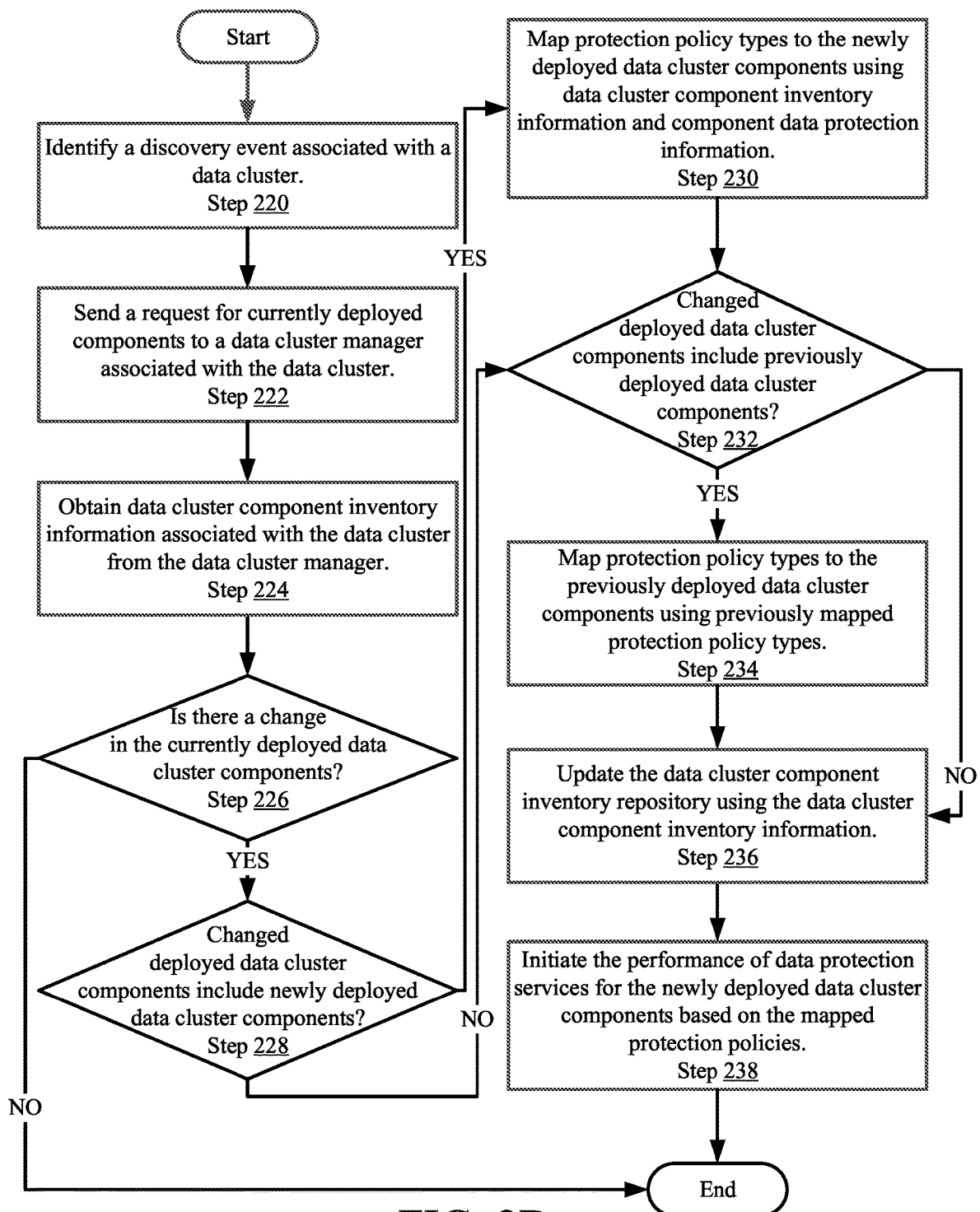
FIG. 2B shows a flowchart of a method for discovering data cluster components in accordance with one or more embodiments of the invention.

FIG. 2B shows a flowchart of a method for discovering data cluster components in accordance with one or more embodiments of the invention. The method may be performed by, for example, a mapping module (102, FIG. 1B) of a data protection manager (100, FIG. 1A). Other components of the system illustrated in FIGS. 1A-1E may perform all, or a portion, of the method of FIG. 2B without departing from the invention.

While FIG. 2B is illustrated as a series of steps, any of the steps may be omitted, performed in a different order, additional steps may be included, and/or any or all of the steps may be performed in a parallel and/or partially overlapping manner without departing from the invention.

In step 220, a discovery event associated with a data cluster is identified.

In one or more embodiments of the invention, the mapping module is configured to perform periodic discoveries of data cluster components for data clusters that have registered with the data protection manager. The mapping module may monitor the amount of time that has passed since a previous discovery was performed for a data cluster. The mapping module may, after a configurable amount of time has passed since the last discovery of the data cluster was performed, perform a subsequent discovery of the data cluster components of the data cluster. The mapping module may identify the expiration of the configurable amount of time since the previous discovery was performed as the discovery event. The discovery event associated with the data cluster may be identified via other and/or additional methods without departing from the invention.

In one or more embodiments of the invention, a user of the data cluster and/or the data protection manager sends a message to the mapping module of the data protection manager. The message may include a request to perform a data cluster discovery. The message may include communication information. The communication information may include a data cluster identifier, a data cluster manager identifier, a data cluster manager network address, an SFTP server identifier, an SFTP server network address, and security information (e.g., security keys, encryption keys, etc.). The communication information may include other and/or additional information that may be used to communicate with the data cluster and the data cluster manager of the data cluster associated with the initial discovery event without departing from the invention. The message may include other and/or additional information without departing from the invention. The message may be transmitted to the mapping module using any appropriate method of data transmission (e.g., network packets, application programming interface (API) calls, etc.) without departing from the invention. The mapping module of the data protection manager may identify obtaining the request to perform a data cluster discovery as the discovery event. The initial discovery event associated with the data cluster may be identified via other and/or additional methods without departing from the invention.

In one or more embodiments of the invention, a data cluster manager of a data cluster sends a message to the mapping module of the data protection manager. The message may include a request to register the data cluster with the data protection manager. The message may include communication information. The communication information may include a data cluster identifier, a data cluster manager identifier, a data cluster manager network address, an SFTP server identifier, an SFTP server network address, and security information (e.g., a security key, an encryption key, etc.). The communication information may include other and/or additional information that may be used to communicate with the data cluster and the data cluster manager of the data cluster associated with the initial discovery event without departing from the invention. The message may include other and/or additional information without departing from the invention. The message may be transmitted to the mapping module using any appropriate method of data transmission (e.g., network packets, application programming interface (API) calls, etc.) without departing from the invention. The mapping module of the data protection manager may identify obtaining the registration request as the discovery event. The initial discovery event associated with the data cluster may be identified via other and/or additional methods without departing from the invention.

In step 222, a request for currently deployed components is sent to a data cluster manager associated with the data cluster.

In one or more embodiments of the invention, the mapping module of the data protection manager sends a message to the data cluster manager of the data cluster associated with the initial discovery event. The message may include a request for currently deployed components of the data cluster that require data protection. The message may be sent using the communication information. The message may include other and/or additional information without departing from the invention. The message may be transmitted to the mapping module using any appropriate method of data transmission (e.g., network packets, application programming interface (API) calls, etc.) without departing from the invention. The request for currently deployed component may be sent to the data cluster manager associated with the data cluster via other and/or additional methods without departing from the invention.

The data cluster may include one or more components that are not discoverable by the data cluster manager. In such scenarios, in one or more embodiments of the invention, the mapping module sends a message to a user of the data cluster. The message may include a request for currently deployed components of the data cluster that may not be discoverable by the data cluster manager that require data protection. The message may be sent using the communication information. The message may include other and/or additional information without departing from the invention. The message may be transmitted to the user using any appropriate method of data transmission (e.g., network packets, application programming interface (API) calls, etc.) without departing from the invention.

In step 224, data cluster component inventory information associated with the data cluster is obtained from the data cluster manager.

In one or more embodiments of the invention, the mapping module obtains a message from the data cluster manager of the data cluster. The message may include data cluster component inventory information associated with the data cluster. The message may include other and/or additional information without departing from the invention. In response to obtaining the request of step 202, the data cluster manager may generate and/or obtain the data cluster component inventory information. The data cluster component inventory information may be associated with each data cluster component that is discoverable by the data cluster manager. The message may be transmitted to the mapping module using any appropriate method of data transmission (e.g., network packets, application programming interface (API) calls, etc.) without departing from the invention. The data cluster component inventory information associated with the data cluster may be obtained from the data cluster manager via other and/or additional methods without departing from the invention.

As discussed above, the data cluster may include one or more components that may not be discoverable by the data cluster manager. In such scenarios, in one or more embodiments of the invention, the mapping module obtains a message from the user of the data cluster and/or the data protection manager. The message may include data cluster component inventory information associated with the data cluster. The message may include other and/or additional information without departing from the invention. In response to obtaining the request of step 202, the user may generate and/or obtain the data cluster component inventory information. The data cluster component inventory information may be associated with each data cluster component that is not discoverable by the data cluster manager. The message may be transmitted to the mapping module using any appropriate method of data transmission (e.g., network packets, application programming interface (API) calls, etc.) without departing from the invention. The data cluster component inventory information associated with the data cluster may be obtained from the user via other and/or additional methods without departing from the invention.

In step 226, a determination is made as to whether there is a change in the currently deployed data cluster components.

In one or more embodiments of the invention, the mapping module determines whether there is change in the currently deployed data cluster component of the data cluster using the data cluster component inventory information obtained in step 224 and the data cluster component inventory repository. The data cluster component inventory repository may include an entry associated with the data cluster. The mapping module may identify the entry associated with the data cluster using the data cluster identifier associated with the data cluster. The entry may include a list of data cluster components deployed in the data cluster at the time of the previous discovery event. The data cluster component inventory information may include a list of data cluster components currently deployed in the data cluster. The mapping module may compare the list of previously deployed data cluster components with the list of currently deployed data cluster components.

If the list of currently deployed data cluster components does not match the list of previously deployed data cluster components, then the mapping module may determine that there is a change in the currently deployed data cluster components. If the list of currently deployed data cluster components matches the list of previously deployed data cluster components, then the mapping module may determine that there is not a change in the currently deployed data cluster components. The determination as to whether there is a change in the currently deployed data cluster components may be made via other and/or additional methods without departing from the invention.

In one or more embodiments of the invention, if it is determined that there is a change in the currently deployed data cluster components, then the method proceeds to step 228. In one or more embodiments of the invention, if it is determined that there is not a change in the currently deployed data cluster components, then the method ends following step 226.

In step 228, a determination is made as to whether the changed deployed data cluster components include newly deployed data cluster components.

In one or more embodiments of the invention, the mapping module may determine whether the changed deployed data cluster components include newly deployed data cluster components using the data cluster component inventory repository and the data cluster component inventory information obtained in step 224. The data cluster component inventory repository may include an entry associated with the data cluster. The mapping module may identify the entry associated with the data cluster using the data cluster identifier associated with the data cluster. The entry may include a list of data cluster components (i.e., data cluster component identifiers) deployed in the data cluster at the time of the previous discovery event. The data cluster component inventory information may include a list of data cluster components (i.e., data cluster component identifiers) currently deployed in the data cluster. The mapping module may compare the list of previously deployed data cluster components with the list of currently deployed data cluster components.

If the list of currently deployed data cluster components includes one or more data cluster components not included in the list of previously deployed data cluster components, then the mapping module may determine that the changed deployed data cluster components includes newly deployed data cluster components. If the list of currently deployed data cluster components does not include one or more data cluster components not included in the list of previously deployed data cluster components, then the mapping module may determine that the changed deployed data cluster components includes newly deployed data cluster components. The determination as to whether the changed deployed data cluster components include newly deployed data cluster components may be made via other and/or additional methods without departing from the invention.

In one or more embodiments of the invention, if it is determined that the changed deployed data cluster components include newly deployed data cluster components, then the method proceeds to step 230. In one or more embodiments of the invention, if it is determined that the changed deployed data cluster components does not include newly deployed data cluster components, then the method ends following step 232.

In step 230, protection policies are mapped to the newly deployed data cluster components using data cluster component inventory information and component data protection information.

In one or more embodiments of the invention, the mapping module uses the data cluster component inventory and the component data protection information associated with the data cluster components to map protection policy types to each newly deployed data cluster component of the data cluster specified by the data cluster component inventory information. The data cluster component inventory information includes a component identifier and a component type associated with each data cluster component currently deployed in the data cluster. The mapping module may identify all data cluster components included in list of currently deployed data components and not included in the list of previously deployed components as the newly deployed data cluster components.

For each newly deployed data cluster component, the mapping module may identify a portion of the component data protection information associated with the component type of the data cluster component. The component data protection information may specify data protection requirements associated with each data cluster component type. The component data protection information may also include the protection policy types that may be mapped to the data cluster components. The mapping module may compare the data protection requirements of the data cluster component type specified by the component data protection information with the data protection requirements specified by each protection policy type. The mapping module may map the protection policy type of the protection policy types that meets the data protection requirements associated with the newly deployed data cluster component by associating the data cluster component identifier of the newly deployed data cluster component with the protection policy type. The protection policy types may be mapped to the newly deployed data cluster components using data cluster component inventory information and component data protection information via other and/or additional methods without departing from the invention.

In step 232, a determination is made as to whether the changed deployed data cluster components include previously deployed data cluster components.

In one or more embodiments of the invention, the mapping module may determine whether the changed deployed data cluster components include previously deployed data cluster components using the data cluster component inventory repository and the data cluster component inventory information obtained in step 224. The data cluster component inventory repository may include an entry associated with the data cluster. The mapping module may identify the entry associated with the data cluster using the data cluster identifier associated with the data cluster. The entry may include a list of data cluster components (i.e., data cluster component identifiers) deployed in the data cluster at the time of the previous discovery event. The entry may also include a list of data cluster components that were deployed in the data cluster at any point in the past that were removed from the data cluster. The data cluster component inventory information may include a list of data cluster components (i.e., data cluster component identifiers) currently deployed in the data cluster. The mapping module may compare the list of previously deployed data cluster components with the list of currently deployed data cluster components.

If the list of currently deployed data cluster components includes one or more data cluster components included in the list of data cluster components that were deployed in the data cluster at any point in the past that were removed from the data cluster, then the mapping module may determine that the changed deployed data cluster components includes previously deployed data cluster components. If the list of currently deployed data cluster components does not include one or more data cluster components included in the list of data cluster components that were deployed in the data cluster at any point in the past that were removed from the data cluster, then the mapping module may determine that the changed deployed data cluster components do not include previously deployed data cluster components. The determination as to whether the changed deployed data cluster components include previously deployed data cluster components may be made via other and/or additional methods without departing from the invention.

In one or more embodiments of the invention, if it is determined that the changed deployed data cluster components include previously deployed data cluster components, then the method proceeds to step 234. In one or more embodiments of the invention, if it is determined that the changed deployed data cluster components does not include previously deployed data cluster components, then the method ends following step 236.

In step 234, protection policy types are mapped to the previously deployed data cluster components using previously mapped data protection policies.

In one or more embodiments of the invention, the mapping module uses the data cluster inventory information repository to map the protection policy types to the previously deployed data cluster components. The data cluster component inventory repository may include an entry associated with the data cluster. The mapping module may identify the entry associated with the data cluster using the data cluster identifier associated with the data cluster. The entry may include a list of data cluster components (i.e., data cluster component identifiers) deployed in the data cluster at the time of the previous discovery event. Each data cluster components included in the aforementioned list may also be associated with the protection policy type that was previously mapped to the data cluster component. The mapping module may map the previously mapped protection policy type to each previously deployed data cluster component by associated the data cluster component identifier of each previously deployed data cluster component with the protection policy type specified in the data cluster component inventory repository entry. Protection policy types may be mapped to the previously deployed data cluster components using previously mapped data protection policy types via other and/or additional methods without departing from the invention.

In step 236, the data cluster component inventory repository is updated using the data cluster component inventory information.

In one or more embodiments of the invention, the mapping module updates the data cluster component inventory repository using the data cluster component inventory information by updating a data cluster component inventory repository entry associated with the data cluster. The mapping module may identify the entry associated with the data cluster using the data cluster identifier. The mapping module may update the list of currently deployed data cluster components by including newly deployed data cluster components and/or previously deployed data cluster components and deleting removed data cluster components. The mapping module may add the removed data cluster components to the list of data cluster components that were deployed in the data cluster at any point in the past that were removed from the data cluster. The mapping module may also include the protection policy type mappings associated with each newly deployed data cluster component in the entry. The mapping module may include other and/or additional information associated with the data cluster components of the data cluster in the entry without departing from the invention. The data cluster component inventory repository may be updated using the data cluster component inventory information via other and/or additional methods without departing from the invention.

In step 238, the performance of data protection services for the newly deployed data cluster components is initiated based on the mapped protection policies.

In one or more embodiments of the invention, the mapping module initiates the performance of data protection services for the newly deployed data cluster components using the mapped protection policy types. The protection policy types may include protection policies that specify data protection requirements associated with the data cluster components. The mapping module may initiate the performance of data protection services for each newly deployed data cluster component that satisfy the data protection requirements of each data cluster component specified by each mapped protection policy type. The mapping module may cancel and/or other stop performing at least a portion of the data protection services associated with data cluster components that were removed from the data cluster.

The data protection services may include generating backups of data cluster components according to a schedule specified by the mapped protection policy types, storing backups in storage locations specified by the mapped protection policy types, and other and/or additional data protection services that satisfy data protection requirements specified by the mapped protection policy types without departing from the invention. The mapping module may initiate the performance of the data protection services by requesting the data protection manager to monitor the protection policy types mapped to each data cluster component of the data cluster and to perform the data protection services specified by the mapped protection policy types. As a result, the data protection manager may perform the data protection services. The performance of data protection services for the newly deployed data cluster components may be initiated based on the mapped protection policy types via other and/or additional methods without departing from the invention.

In one or more embodiments of the invention, the method ends following step 238.

Figure 2C:
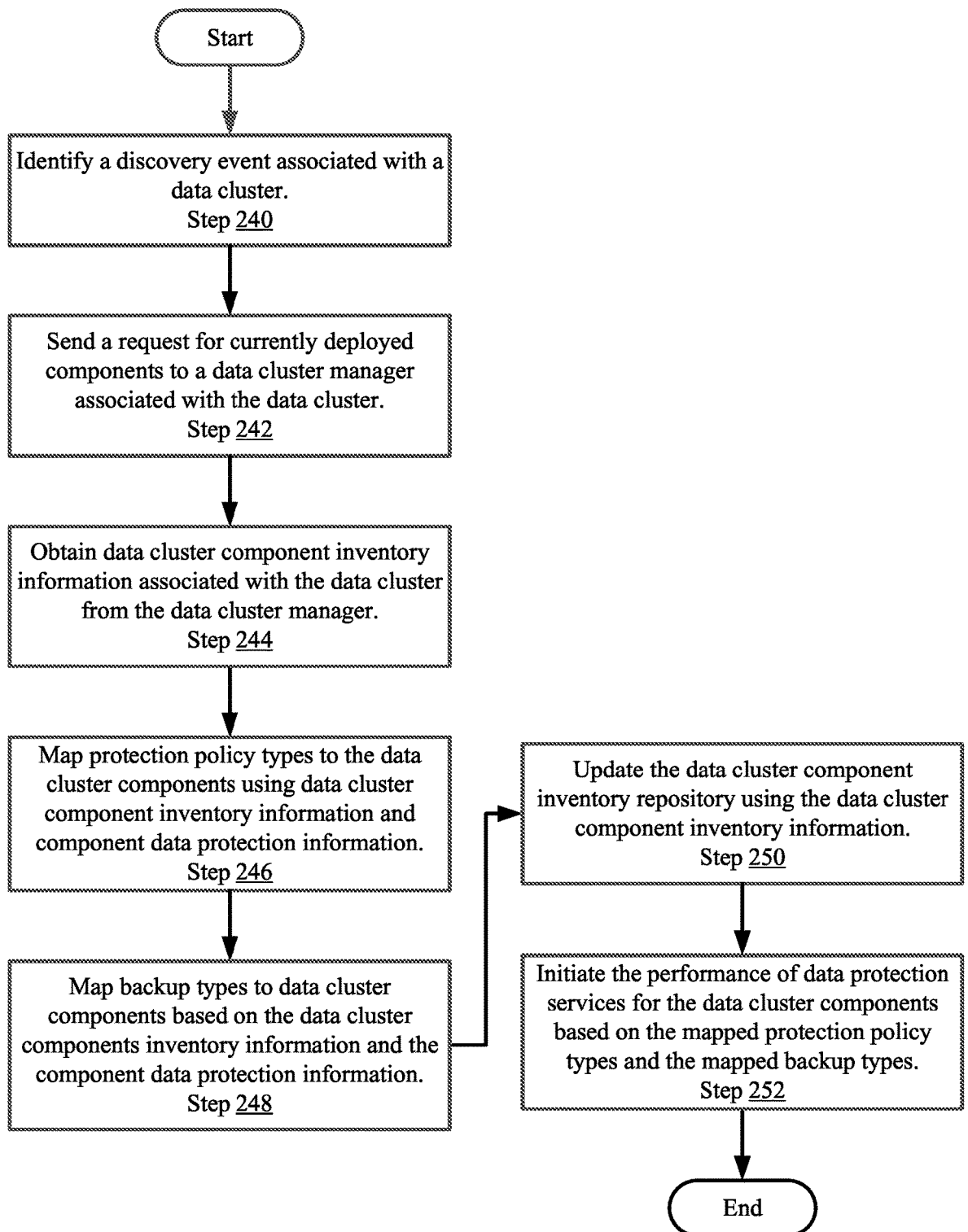
FIG. 2C shows a diagram of a method for mapping data protection services to data cluster components in accordance with one or more embodiments of the invention.

FIG. 2C shows a diagram of a method for mapping data protection services to data cluster components in accordance with one or more embodiments of the invention. The method may be performed by, for example, a data type module (104, FIG. 1B) of a data protection manager (100, FIG. 1A). Other components of the system illustrated in FIGS. 1A-1E may perform all, or a portion, of the method of FIG. 2C without departing from the invention.

While FIG. 2C is illustrated as a series of steps, any of the steps may be omitted, performed in a different order, additional steps may be included, and/or any or all of the steps may be performed in a parallel and/or partially overlapping manner without departing from the invention.

In step 240, a discovery event associated with a data cluster is identified.

In one or more embodiments of the invention, the mapping module is configured to perform periodic discoveries of data cluster components for data clusters that have registered with the data protection manager. The mapping module may monitor the amount of time that has passed since a previous discovery was performed for a data cluster. The mapping module may, after a configurable amount of time has passed since the last discovery of the data cluster was performed, perform a subsequent discovery of the data cluster components of the data cluster. The mapping module may identify the expiration of the configurable amount of time since the previous discovery was performed as the discovery event. The discovery event associated with the data cluster may be identified via other and/or additional methods without departing from the invention.

In one or more embodiments of the invention, a user of the data cluster and/or the data protection manager sends a message to the mapping module of the data protection manager. The message may include a request to perform a data cluster discovery. The message may include communication information. The communication information may include a data cluster identifier, a data cluster manager identifier, a data cluster manager network address, an SFTP server identifier, an SFTP server network address, and security information (e.g., security keys, encryption keys, etc.). The communication information may include other and/or additional information that may be used to communicate with the data cluster and the data cluster manager of the data cluster associated with the initial discovery event without departing from the invention. The message may include other and/or additional information without departing from the invention. The message may be transmitted to the mapping module using any appropriate method of data transmission (e.g., network packets, application programming interface (API) calls, etc.) without departing from the invention. The mapping module of the data protection manager may identify obtaining the request to perform a data cluster discovery as the discovery event. The initial discovery event associated with the data cluster may be identified via other and/or additional methods without departing from the invention.

In one or more embodiments of the invention, a data cluster manager of a data cluster sends a message to the mapping module of the data protection manager. The message may include a request to register the data cluster with the data protection manager. The message may include communication information. The communication information may include a data cluster identifier, a data cluster manager identifier, a data cluster manager network address, an SFTP server identifier, an SFTP server network address, and security information (e.g., a security key, an encryption key, etc.). The communication information may include other and/or additional information that may be used to communicate with the data cluster and the data cluster manager of the data cluster associated with the initial discovery event without departing from the invention. The message may include other and/or additional information without departing from the invention. The message may be transmitted to the mapping module using any appropriate method of data transmission (e.g., network packets, application programming interface (API) calls, etc.) without departing from the invention. The mapping module of the data protection manager may identify obtaining the registration request as the discovery event. The initial discovery event associated with the data cluster may be identified via other and/or additional methods without departing from the invention.

In step 242, a request for currently deployed components is sent to a data cluster manager associated with the data cluster.

In one or more embodiments of the invention, the mapping module of the data protection manager sends a message to the data cluster manager of the data cluster associated with the initial discovery event. The message may include a request for currently deployed components of the data cluster that require data protection. The message may be sent using the communication information. The message may include other and/or additional information without departing from the invention. The message may be transmitted to the mapping module using any appropriate method of data transmission (e.g., network packets, application programming interface (API) calls, etc.) without departing from the invention. The request for currently deployed component may be sent to the data cluster manager associated with the data cluster via other and/or additional methods without departing from the invention.

The data cluster may include one or more components that are not discoverable by the data cluster manager. In such scenarios, in one or more embodiments of the invention, the mapping module sends a message to a user of the data cluster. The message may include a request for currently deployed components of the data cluster that may not be discoverable by the data cluster manager that require data protection. The message may be sent using the communication information. The message may include other and/or additional information without departing from the invention. The message may be transmitted to the user using any appropriate method of data transmission (e.g., network packets, application programming interface (API) calls, etc.) without departing from the invention.

In step 244, data cluster component inventory information associated with the data cluster is obtained from the data cluster manager.

In one or more embodiments of the invention, the mapping module obtains a message from the data cluster manager of the data cluster. The message may include data cluster component inventory information associated with the data cluster. The message may include other and/or additional information without departing from the invention. In response to obtaining the request, the data cluster manager may generate and/or obtain the data cluster component inventory information. The data cluster component inventory information may be associated with each data cluster component that is discoverable by the data cluster manager. The message may be transmitted to the mapping module using any appropriate method of data transmission (e.g., network packets, application programming interface (API) calls, etc.) without departing from the invention. The data cluster component inventory information associated with the data cluster may be obtained from the data cluster manager via other and/or additional methods without departing from the invention.

As discussed above, the data cluster may include one or more components that may not be discoverable by the data cluster manager. In such scenarios, in one or more embodiments of the invention, the mapping module obtains a message from the user of the data cluster and/or the data protection manager. The message may include data cluster component inventory information associated with the data cluster. The message may include other and/or additional information without departing from the invention. In response to obtaining the request, the user may generate and/or obtain the data cluster component inventory information. The data cluster component inventory information may be associated with each data cluster component that is not discoverable by the data cluster manager. The message may be transmitted to the mapping module using any appropriate method of data transmission (e.g., network packets, application programming interface (API) calls, etc.) without departing from the invention. The data cluster component inventory information associated with the data cluster may be obtained from the user via other and/or additional methods without departing from the invention.

In step 246, protection policies are mapped to the data cluster components using data cluster component inventory information and component data protection information.

In one or more embodiments of the invention, the mapping module uses the data cluster component inventory and the component data protection information associated with the data cluster components to map protection policy types to each data cluster component of the data cluster specified by the data cluster component inventory information. The data cluster component inventory information includes a component identifier and a component type associated with each data cluster component currently deployed in the data cluster. For each data cluster component, the mapping module may identify a portion of the component data protection information associated with the component type of the data cluster component. The component data protection information may specify data protection requirements associated with each data cluster component type. The component data protection information may also include the protection policy types that may be mapped to the data cluster components.

The mapping module may compare the data protection requirements of the data cluster component specified by the component data protection information with the data protection requirements specified by each protection policy type. The mapping module may map the protection policy type of the protection policy types that meets the data protection requirements associated with data cluster component by associating the data cluster component identifier with the protection policy type. The protection policy types may be mapped to the data cluster components using data cluster component inventory information and component data protection information via other and/or additional methods without departing from the invention.

In step 248, backup types are mapped to the data cluster components using data cluster component inventory information and component data protection information.

In one or more embodiments of the invention, the data type module of the data protection manager uses the data cluster component inventory information and the component data protection information to map backup types to the data cluster components. The data cluster component inventory information may include data types associated with each currently deployed data cluster component. The data cluster component inventory may also include data change rates associated with each currently deployed data cluster component. The component data protection information may also specify data types associated with each data cluster component type. The component data protection information may include backup types that specify data type requirements associated with each backup type. The backup types may include full backups, incremental backups, snapshots, block-based backups, file-based backups, image-based backups, and/or other and/or additional backup types without departing from the invention. Each backup type may be associated with a different data type and/or data change rates. For each currently deployed data cluster component, the data type module may compare the data type and change rate specified by the data cluster component inventory information with the backup type requirements of the backup types. The data type module may map a backup type associated with backup type requirements that match the data type and change rate associated with each currently deployed component. The backup types may be mapped to the data cluster components using data cluster component inventory information and component data protection information via other and/or additional methods without departing from the invention.

In step 250, the data cluster component inventory repository is updated using the data cluster component inventory information.

In one or more embodiments of the invention, the mapping module updates the data cluster component inventory repository using the data cluster component inventory information by updating a data cluster component inventory repository entry associated with the data cluster. The mapping module may identify the entry associated with the data cluster using the data cluster identifier. The mapping module may update the list of currently deployed data cluster components by including newly deployed data cluster components and/or previously deployed data cluster components and deleting removed data cluster components. The mapping module may add the removed data cluster components to the list of data cluster components that were deployed in the data cluster at any point in the past that were removed from the data cluster. The mapping module may also include the protection policy type mappings associated with each newly deployed data cluster component in the entry. The mapping module may include other and/or additional information associated with the data cluster components of the data cluster in the entry without departing from the invention. The data cluster component inventory repository may be updated using the data cluster component inventory information via other and/or additional methods without departing from the invention.

In step 252, the performance of data protection services for the data cluster components is initiated based on the mapped protection policies and the mapped backup types.

In one or more embodiments of the invention, the mapping module initiates the performance of data protection services for the newly deployed data cluster components using the mapped protection policy types and the mapped backup types. The protection policy types may include protection policies that specify data protection requirements associated with the data cluster components. The backup types may include backups associated with specific data type requirements. The mapping module may initiate the performance of data protection services for each newly deployed data cluster component that satisfy the data protection requirements and the data type requirements of each data cluster component. The mapping module may cancel and/or other stop performing at least a portion of the data protection services associated with data cluster components that were removed from the data cluster.

The data protection services may include generating backups of data cluster components according to a schedule specified by the mapped protection policy types, generating specific types of backups based on the mapped backup types, storing backups in storage locations specified by the mapped protection policy types, and other and/or additional data protection services that satisfy data protection requirements and data type requirements specified by the mapped protection policy types and the mapped backup types without departing from the invention. The mapping module may initiate the performance of the data protection services by requesting the data protection manager to monitor the protection policy types mapped to each data cluster component of the data cluster and to perform the data protection services specified by the mapped protection policy types. As a result, the data protection manager may perform the data protection services. The performance of data protection services for the newly deployed data cluster components may be initiated based on the mapped protection policy types and the mapped backup types via other and/or additional methods without departing from the invention.

In one or more embodiments of the invention, the method ends following step 252.

Figure 2D:
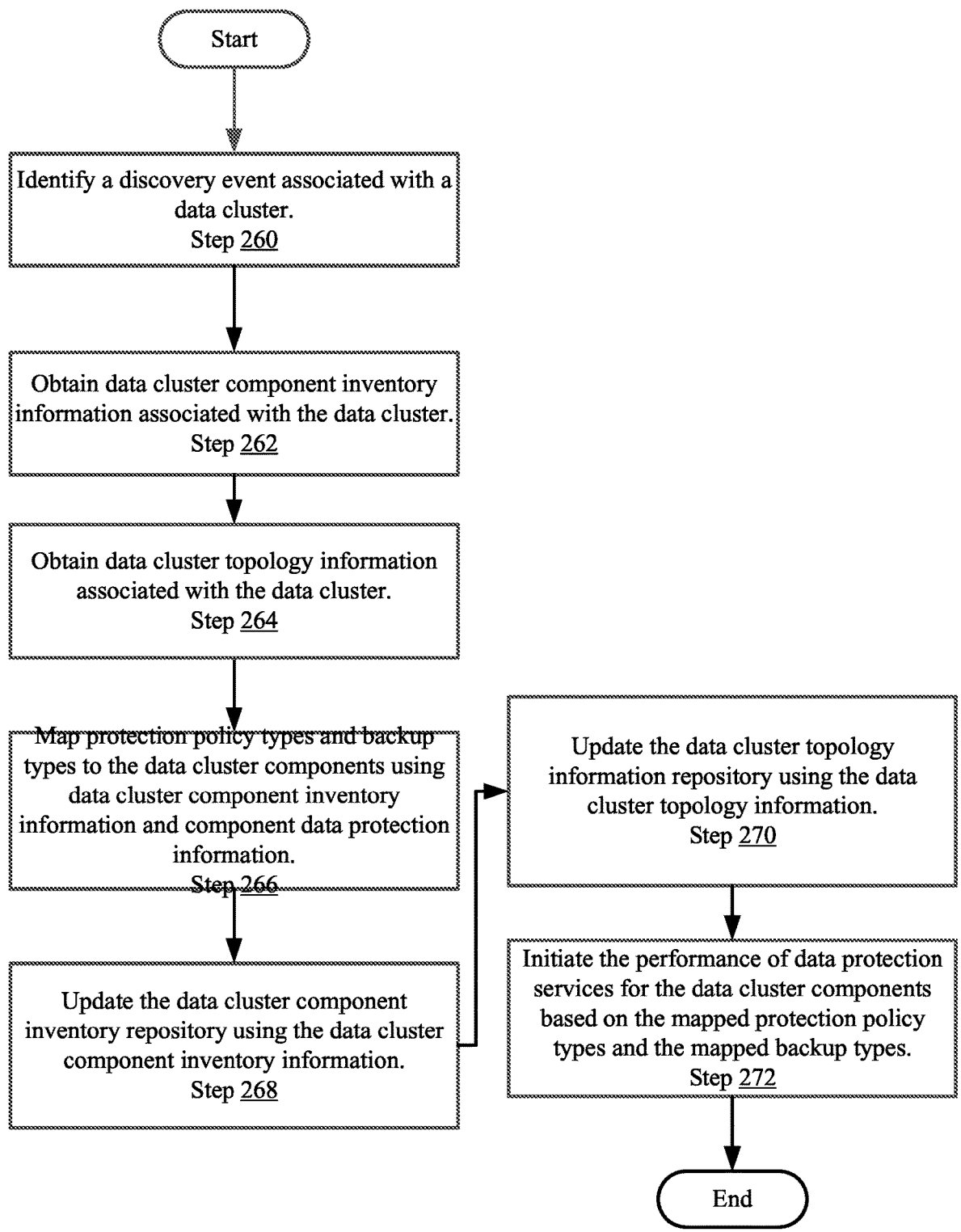
FIG. 2D shows a diagram of a method for discovering data cluster topologies in accordance with one or more embodiments of the invention.

FIG. 2D shows a diagram of a method for discovering data cluster topologies in accordance with one or more embodiments of the invention. The method may be performed by, for example, a data protection manager (100, FIG. 1A). Other components of the system illustrated in FIGS. 1A-1E may perform all, or a portion, of the method of FIG. 2D without departing from the invention.

While FIG. 2D is illustrated as a series of steps, any of the steps may be omitted, performed in a different order, additional steps may be included, and/or any or all of the steps may be performed in a parallel and/or partially overlapping manner without departing from the invention.

In step 260, a discovery event associated with a data cluster is identified.

The discovery event associated with the data cluster may be identified using the methods of step 240 of FIG. 2C discussed above.

In step 262, data cluster component inventory information associated with the data cluster is obtained.

The data cluster component inventory information associated with the data cluster may be obtained using the methods of steps 242 and 244 of FIG. 2C discussed above.

In step 264, data cluster topology information associated with the data cluster is obtained.

In one or more embodiments of the invention, a mapping module of the data protection manager sends a message to the data cluster manager of the data cluster associated with the initial discovery event. The message may include a request for data cluster topology information associated with the data cluster. The message may be sent using the communication information obtained in step 260. The message may include other and/or additional information without departing from the invention. The message may be transmitted to the data cluster manager using any appropriate method of data transmission (e.g., network packets, application programming interface (API) calls, etc.) without departing from the invention. The request for client topology information associated with the data cluster may be sent to the data cluster manager associated with the data cluster via other and/or additional methods without departing from the invention.

In one or more embodiments of the invention, the mapping module obtains a message from the data cluster manager of the data cluster. The message may include data cluster topology information associated with the data cluster. The message may include other and/or additional information without departing from the invention. In response to obtaining the request, the data cluster manager may generate and/or obtain the data cluster topology information. The message may be transmitted to the mapping module using any appropriate method of data transmission (e.g., network packets, application programming interface (API) calls, etc.) without departing from the invention. The data cluster topology information associated with the data cluster may be obtained from the data cluster manager via other and/or additional methods without departing from the invention.

In step 266, protection policy types and backup types are mapped to the data cluster components using data cluster component inventory information and component data protection information.

Protection policy types and backup types may be mapped to the data cluster components using the methods of steps 246 and 248 of FIG. 2C discussed above.

In step 268, the data cluster component inventory repository is updated using the data cluster component inventory information.

The data cluster component inventory repository may be updated using the methods of step 250 of FIG. 2C discussed above.

In step 270, the data cluster topology information repository is updated using the data cluster topology information.

In one or more embodiments of the invention, the mapping module updates the data cluster topology information repository using the data cluster topology information by generating or updating a data cluster component topology information repository entry associated with the data cluster. The mapping module may identify the entry associated with the data cluster using the data cluster identifier. The mapping module may include the resource identifiers and the resource information associated with the resources of the data cluster specified by the data cluster topology information in the entry. The mapping module may include other and/or additional information associated with the data cluster topology of the data cluster in the entry without departing from the invention. The data cluster topology information repository may be updated using the data cluster topology information via other and/or additional methods without departing from the invention.

In step 272, the performance of data protection services for the data cluster components is initiated based on the mapped protection policies and the mapped backup types.

The performance of data protection services for the data cluster components may be initiated based on the mapped protection policy types and the mapped backup types using the methods of step 252 of FIG. 2C discussed above.

In one or more embodiments of the invention, the method ends following step 272.

Figure 2E:
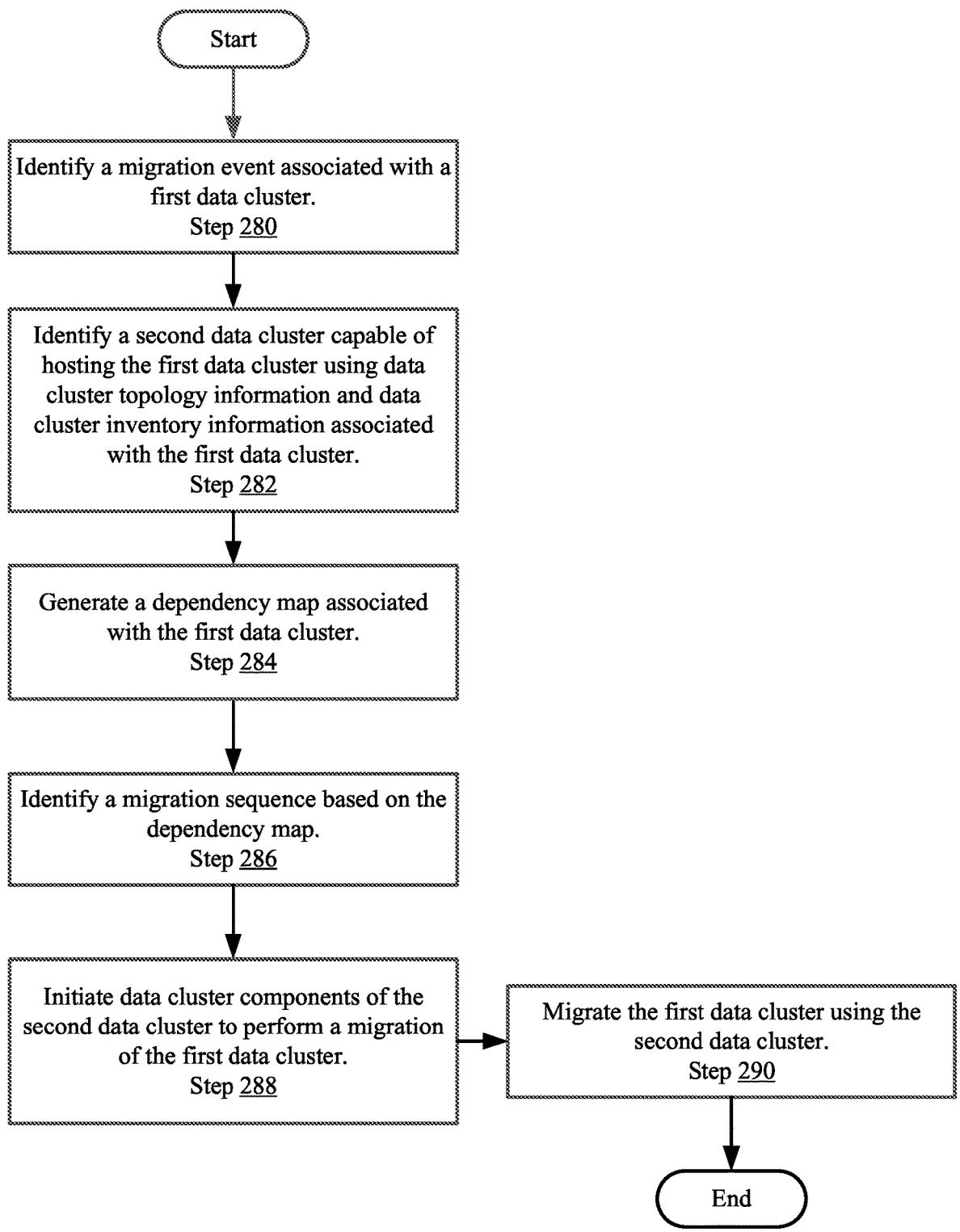
FIG. 2E shows a diagram of a method for restoring a data cluster in accordance with one or more embodiments of the invention.

FIG. 2E shows a diagram of a method for restoring a data cluster in accordance with one or more embodiments of the invention. The method may be performed by, for example, a data type module (104, FIG. 1B) of a data protection manager (100, FIG. 1A). Other components of the system illustrated in FIGS. 1A-1E may perform all, or a portion, of the method of FIG. 2E without departing from the invention.

While FIG. 2E is illustrated as a series of steps, any of the steps may be omitted, performed in a different order, additional steps may be included, and/or any or all of the steps may be performed in a parallel and/or partially overlapping manner without departing from the invention.

In step 280, a migration event associated with a first data cluster is identified.

In one or more embodiments of the invention, a user of the data cluster and/or the data protection manager sends a message to the data protection manager. The message may include a request to migrate the first data cluster. The message may include communication information. A data cluster may be migrated to duplicate a data cluster, to move a data cluster, to restore a data cluster, or other and/or additional purposes without departing from the invention. The message may include other and/or additional information without departing from the invention. The message may be transmitted to the data protection manager using any appropriate method of data transmission (e.g., network packets, application programming interface (API) calls, etc.) without departing from the invention. The data protection manager may identify obtaining the request as the migration event. The migration event associated with the first data cluster may be identified via other and/or additional methods without departing from the invention.

In step 282, a second data cluster capable of hosting the first data cluster is identified using data cluster topology information and data cluster component inventory information associated with the first data cluster.

In one or more embodiments of the invention, the data protection manager uses data cluster topology information associated with the first data cluster to identify the second data cluster capable of hosting the first data cluster. The data protection manager may use the data cluster identifier associated with the first data cluster to identify the data cluster topology information repository entry associated with the first data cluster. The data protection manager may use the data cluster identifier to identify a data cluster component inventory entry associated with the first data cluster. The data cluster component inventory entry may specify the data cluster components of the first data cluster. Additionally, the data cluster topology information repository entry specifies the resources of the first data cluster. The data cluster topology information repository entry may further include resource information associated with the resources of the first data cluster. The resource information may specify the resource types, resource performance characteristics, resource availability, the resources associated with each data cluster component of the first data cluster specified by the data cluster component inventory information, and other and/or additional information regarding the resources of the first data cluster.

The data protection manager may compare the data cluster topology information associated with the first data cluster with the data cluster topology information associated with other data clusters included in the data cluster topology information repository. The data cluster may identify a data cluster that is associated with data cluster topology information that indicates that the second data cluster includes at least the resources to host and/or instantiate the first data cluster components. The identified data cluster may be identified as the second data cluster. The second data cluster capable of hosting the first data cluster may be identified using data cluster topology information and data cluster component inventory information associated with the first data cluster In step 284, a dependency map associated with the first data cluster is generated.

In one or more embodiments of the invention, the data protection manager generates a dependency map using the data cluster component inventory information included in the data cluster component inventory repository entry associated with the first data cluster. The data cluster component inventory may include dependency information. The dependency information may specify, for each component, all data cluster components upon which they are dependent. The data protection manager may use the dependency information to generate the dependency map. As a result, the dependency map may specify a hierarchical structure of data cluster component dependencies. The dependency map associated with the first data cluster component may be generated via other and/or additional methods without departing from the invention.

In step 286, a migration sequence is identified based on the dependency map.

In one or more embodiments of the invention, the data protection manager identifies the migration sequence using the dependency map. As discussed above, the dependency map may include a hierarchical structure of data cluster dependencies. The data protection manager may put data cluster components at the top of dependency map in a higher position in the migration sequence. In other words, a data cluster component upon which other data cluster components are dependent may be migrated before the data cluster components that are dependent upon the aforementioned data cluster component. Additionally, data cluster components that have a higher number of dependent data cluster components may be put in a higher migration sequence position in the migration sequence than data cluster components that have a lower number of dependent data cluster components. The migration sequence may be identified based on the dependency map via other and/or additional methods without departing from the invention.

In step 288, data cluster components of the second data cluster are initiated to perform a migration of the first data cluster.

In one or more embodiments of the invention, the data protection manager may initiate data cluster components of the second data cluster to perform a migration. The data protection manager may initiate the data cluster components of the second data cluster components to perform migration by allocating resources to data cluster components. The data protection manager may use data cluster topology information associated with first data cluster to allocate resources to the data cluster components of the second data cluster as indicated by the data cluster topology information associated with the first data cluster. The data protection manager may generate instructions for allocating the resources of the second data cluster, encapsulate the instructions in a message, and send the message to data cluster manager of the second data cluster. To allocate the resources, the data cluster manager may virtualize any number of data cluster components using the resources of the second data cluster components and/or otherwise modify the operation of any number of resources of the second data cluster to instantiate the data cluster components of the first data cluster. The data cluster components of the second data cluster may be initiated to perform migration of the first data cluster via other and/or additional methods without departing from the invention.

In step 290, the first data cluster is migrated using the second data cluster.

In one or more embodiments of the invention, the data protection manager initiates the instantiation of the data cluster components of the first data cluster using the allocated resources of the second data cluster to migrate the first data cluster to the second data cluster. The data protection manager may send a message to the data cluster manager of the second data cluster. The message may include a request to instantiate the data cluster components of the first data cluster using the allocated resources of the second data cluster. The message may also include the update sequence. In response to obtaining the message, the data cluster manager may instantiate the data cluster components of the first data cluster using the allocated resources of the second data cluster in the order specified by the update sequence. As a result, the first data cluster may be migrated to the second data cluster. The first data cluster may be migrated using the second data cluster via other and/or additional methods without departing from the invention.

In one or more embodiments of the invention, the method ends following step 290.

To further clarify embodiments of the invention, non-limiting examples are provided in FIGS. 3-6. FIGS. 3-6 show diagrams of operations of example systems over time. FIGS. 3-6 may show a system similar to that illustrated in FIG. 1A. Actions performed by components of the system are illustrated by numbered, circular boxes interconnected with arrowed lines. For the sake of brevity, only a limited number of components illustrated in FIG. 1A are illustrated in FIGS. 3-6

EXAMPLES

Figure 3:
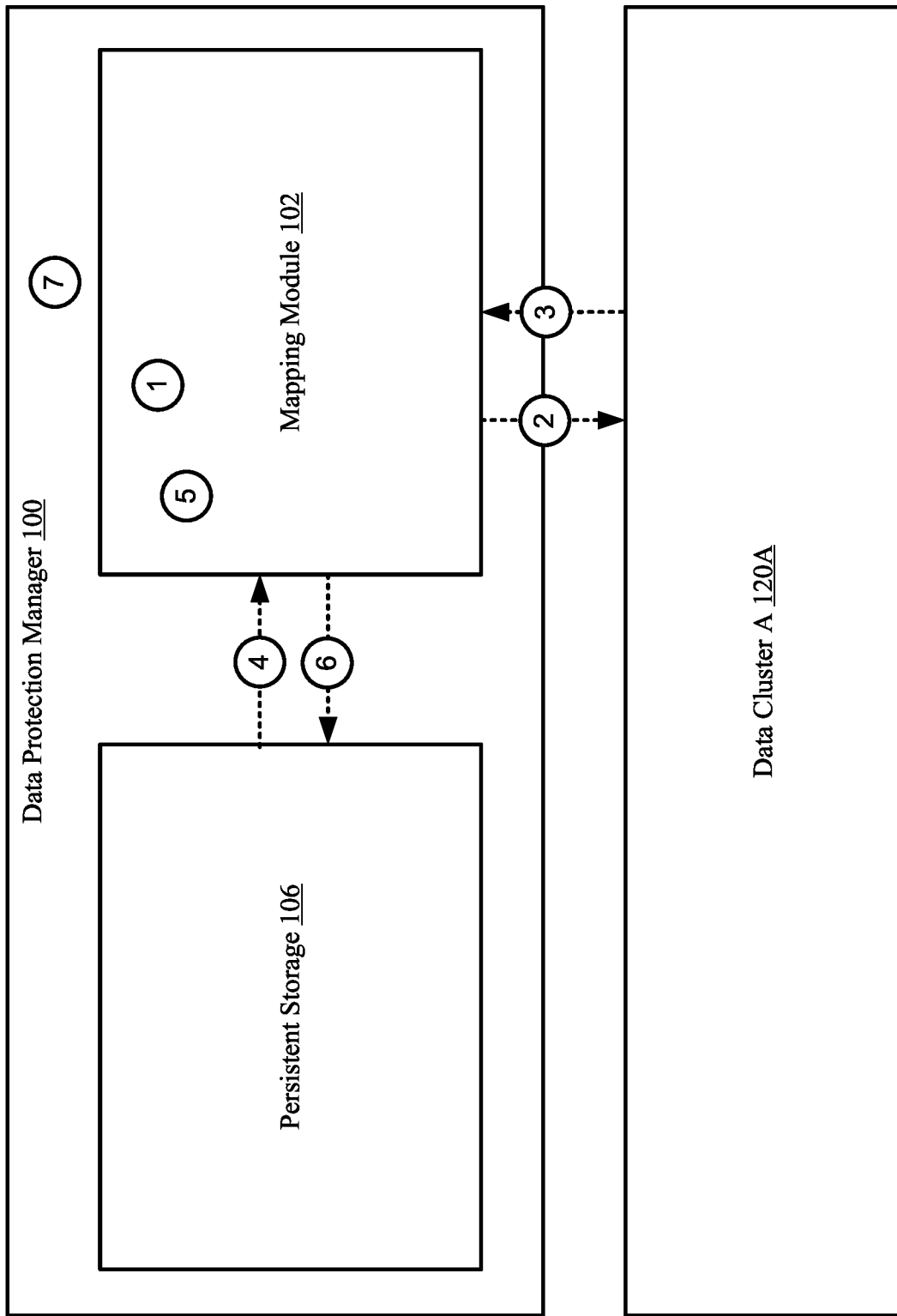
FIG. 3 shows a diagram of the operation of a first example system over time in accordance with one or more embodiments of the invention.

FIG. 3 shows a diagram of the operation of a first example system over time in accordance with one or more embodiments of the invention. Turning to FIG. 3, consider a scenario in which data cluster A (120A) is provisioned and has just registered with a data protection manager (100). The data protection manager (100) includes a mapping module (102) and a persistent storage (106). At step 1, the mapping module (102) of the data protection manager (100) obtains a request to perform an initial discovery of data cluster components associated with data cluster A (120A). In response to obtaining the request to perform an initial discovery of data cluster components, at step 2, the mapping module (102) sends a message to a data cluster manager (not shown) of data cluster A (120A). The message includes a request for currently deployed data cluster components of data cluster A (120A).

In response to obtaining the request, the data cluster manager generates and/or obtains data cluster component inventory information associated with data cluster A (120A). After generating and/or obtaining the data cluster component inventory information, at step 3, the data cluster manager sends the data cluster component inventory information to the mapping module (102). At step 4, the mapping module (102) obtains component data protection information. At step 5, the mapping module uses the data cluster component inventory information and the component data protection information to map protection policies to the data cluster components of data cluster A (120A) resulting in data cluster component protection policy mappings associated with data cluster A (120A).

The data cluster component inventory information may specify the data cluster components currently deployed in data cluster A (120A). The component data protection information may specify, for each type of component, a data protection policy recommended by each type of component by a manufacturer of the component or configured by a user of data cluster A (120A). The mapping module (102) then, at step 6, updates the data cluster component inventory repository stored in the persistent storage (106) with the data cluster component inventory information associated with data cluster A (120A) and stores the data cluster component protection policy mappings associated with data cluster A (120A) in the persistent storage (106). At step 7, the mapping module (102) initiates the performance of data protection services for the data cluster components of data cluster A (120A) based on the data cluster component protection policy mappings associated with data cluster A (120A).

Figure 4:
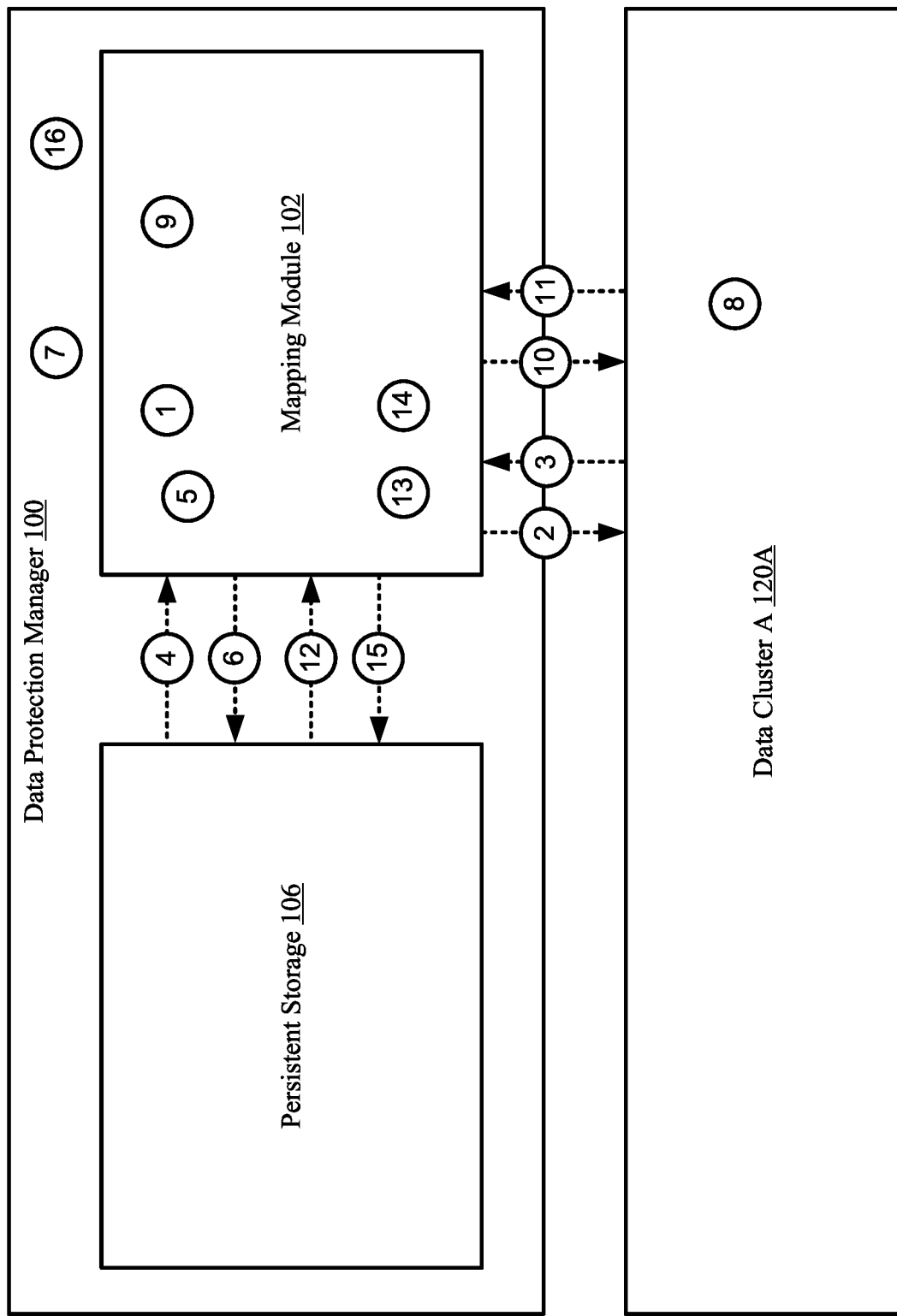
FIG. 4 shows a diagram of the operation of a second example system over time in accordance with one or more embodiments of the invention.

FIG. 4 shows a diagram of the operation of a second example system over time in accordance with one or more embodiments of the invention. Turning to FIG. 4, consider a scenario in which data cluster A (120A) is provisioned and has just registered with a data protection manager (100). The data protection manager (100) includes a mapping module (102) and a persistent storage (106). At step 1, the mapping module (102) of the data protection manager (100) obtains a request to perform an initial discovery of data cluster components associated with data cluster A (120A). In response to obtaining the request to perform an initial discovery of data cluster components, at step 2, the mapping module (102) sends a message to a data cluster manager (not shown) of data cluster A (120A). The message includes a request for currently deployed data cluster components of data cluster A (120A).

In response to obtaining the request, the data cluster manager generates and/or obtains data cluster component inventory information associated with data cluster A (120A). After generating and/or obtaining the data cluster component inventory information, at step 3, the data cluster manager sends the data cluster component inventory information to the mapping module (102). At step 4, the mapping module (102) obtains component data protection information. At step 5, the mapping module uses the data cluster component inventory information and the component data protection information to map protection policies to the data cluster components of data cluster A (120A) resulting in data cluster component protection policy mappings associated with data cluster A (120A).

The data cluster component inventory information specifies the data cluster components currently deployed in data cluster A (120A). The component data protection information specifies, for each type of component, a protection policy recommended by each type of component by a manufacturer of the component or configured by a user of data cluster A (120A). The mapping module (102) then, at step 6, updates the data cluster component inventory repository stored in the persistent storage (106) with the data cluster component inventory information associated with data cluster A (120A) and stores the data cluster component protection policy mappings associated with data cluster A (120A) in the persistent storage (106). At step 7, the mapping module (102) initiates the performance of data protection services for the data cluster components of data cluster A (120A) based on the data cluster component protection policy mappings associated with data cluster A (120A).

After a period of time has passed since step 7, at step 8, new data cluster components are deployed in data cluster A (120A). After the new data cluster components are deployed in data cluster A (120A), at step 9, the mapping module (102) of the data protection manager (100) obtains a request to perform a subsequent discovery of currently deployed data cluster components associated with data cluster A (120A). In response to obtaining the request to perform an initial discovery of data cluster components, at step 10, the mapping module (102) sends a message to a data cluster manager (not shown) of data cluster A (120A). The message includes a request for currently deployed data cluster components of data cluster A (120A).

In response to obtaining the request, the data cluster manager generates and/or obtains data cluster component inventory information associated with data cluster A (120A). After generating and/or obtaining the data cluster component inventory information, at step 11, the data cluster manager sends the data cluster component inventory information to the mapping module (102). At step 12, the mapping module (102) obtains component data protection information and the previously generated data cluster component inventory information from the persistent storage (106). At step 13, the mapping module (102) uses the previously generated data cluster component inventory information and the newly obtained data cluster component inventory information to determine that new data cluster components were deployed in data cluster A (120A). At step 14, the mapping module uses the newly obtained data cluster component inventory information and the component data protection information to map protection policies to the newly deployed data cluster components of data cluster A (120A) resulting in additional data cluster component protection policy mappings associated with data cluster A (120A).

The data cluster component inventory information specifies the data cluster components currently deployed in data cluster A (120A). The component data protection information specifies, for each type of component, a protection policy recommended by each type of component by a manufacturer of the component or configured by a user of data cluster A (120A). The mapping module (102) then, at step 15, updates the data cluster component inventory repository stored in the persistent storage (106) with the newly obtained data cluster component inventory information associated with data cluster A (120A) and stores the additional data cluster component protection policy mappings associated with data cluster A (120A) in the persistent storage (106). At step 16, the mapping module (102) initiates the performance of data protection services for the data cluster components of data cluster A (120A) based on the additional data cluster component protection policy mappings associated with data cluster A (120A).

Figure 5:
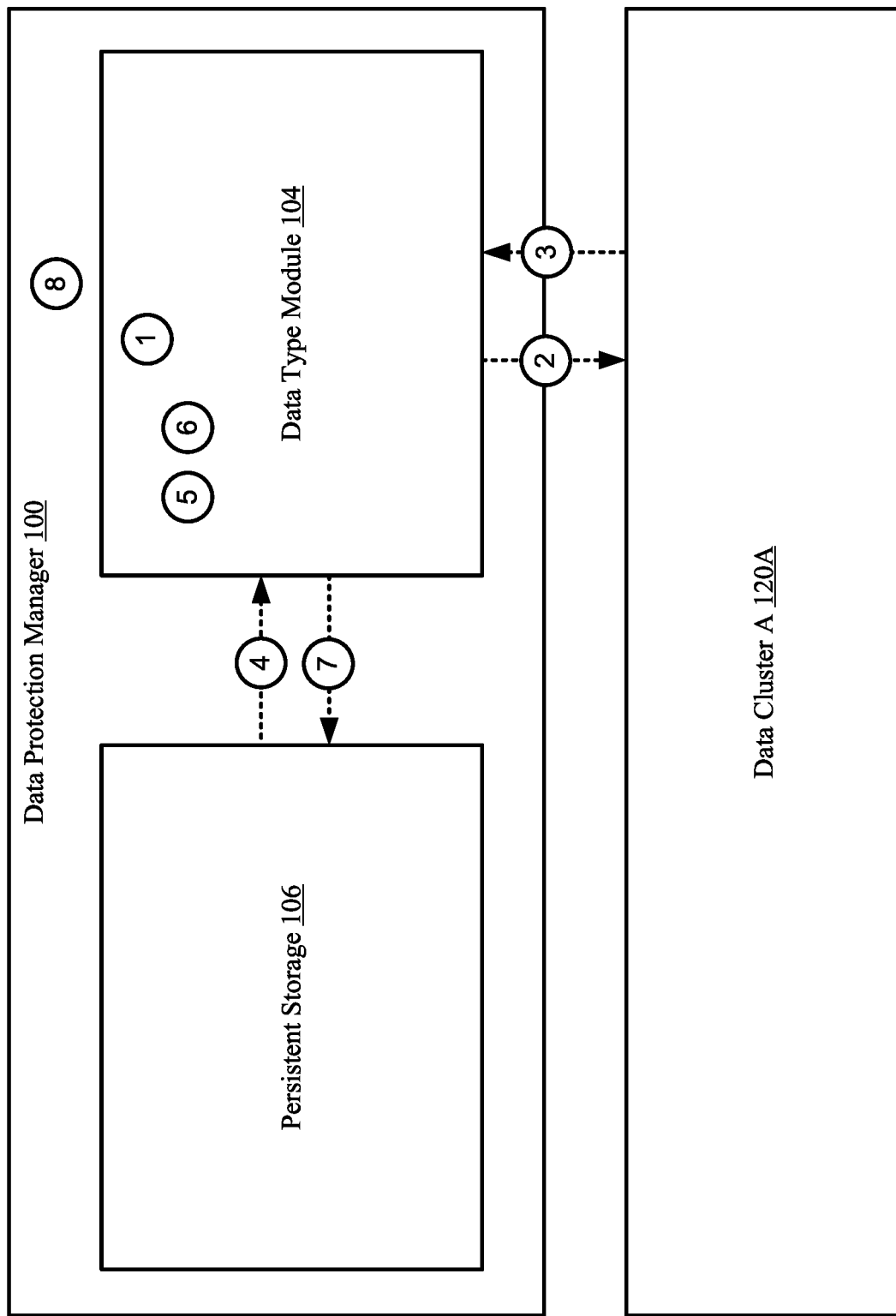
FIG. 5 shows a diagram of the operation of a third example system over time in accordance with one or more embodiments of the invention.

FIG. 5 shows a diagram of the operation of a third example system over time in accordance with one or more embodiments of the invention. Turning to FIG. 5, consider a scenario in which data cluster A (120A) is provisioned and has just registered with a data protection manager (100). The data protection manager (100) includes a data type module (104) and a persistent storage (106). At step 1, the data type module (104) of the data protection manager (100) obtains a request to perform an initial discovery of data cluster components associated with data cluster A (120A). In response to obtaining the request to perform an initial discovery of data cluster components, at step 2, the data type module (104) sends a message to a data cluster manager (not shown) of data cluster A (120A). The message includes a request for currently deployed data cluster components of data cluster A (120A).

In response to obtaining the request, the data cluster manager generates and/or obtains data cluster component inventory information associated with data cluster A (120A). After generating and/or obtaining the data cluster component inventory information, at step 3, the data cluster manager sends the data cluster component inventory information to the data type module (104). At step 4, the data type module (104) obtains component data protection information. At step 5, the data type module (104) uses the data cluster component inventory information and the component data protection information to map protection policies to the data cluster components of data cluster A (120A) resulting in a first portion data cluster component protection policy mappings associated with data cluster A (120A). At step 6, the data type module uses the data cluster component inventory information and the component data protection information to map backup types to the data cluster components of data cluster A (120A) resulting in a second portion data cluster component protection policy mappings associated with data cluster A (120A).

The data cluster component inventory information specifies the data cluster components currently deployed in data cluster A (120A). The component data protection information specifies, for each type of component, a backup type recommended by each type of component by a manufacturer of the component or configured by a user of data cluster A (120A). The data type module (104) then, at step 7, updates the data cluster component inventory repository stored in the persistent storage (106) with the data cluster component inventory information associated with data cluster A (120A) and stores the data cluster component protection policy mappings associated with data cluster A (120A) (both the first portion and the second portion) in the persistent storage (106). At step 8, the data type module (104) initiates the performance of data protection services for the data cluster components of data cluster A (120A) based on the data cluster component protection policy mappings associated with data cluster A (120A).

Figure 6:
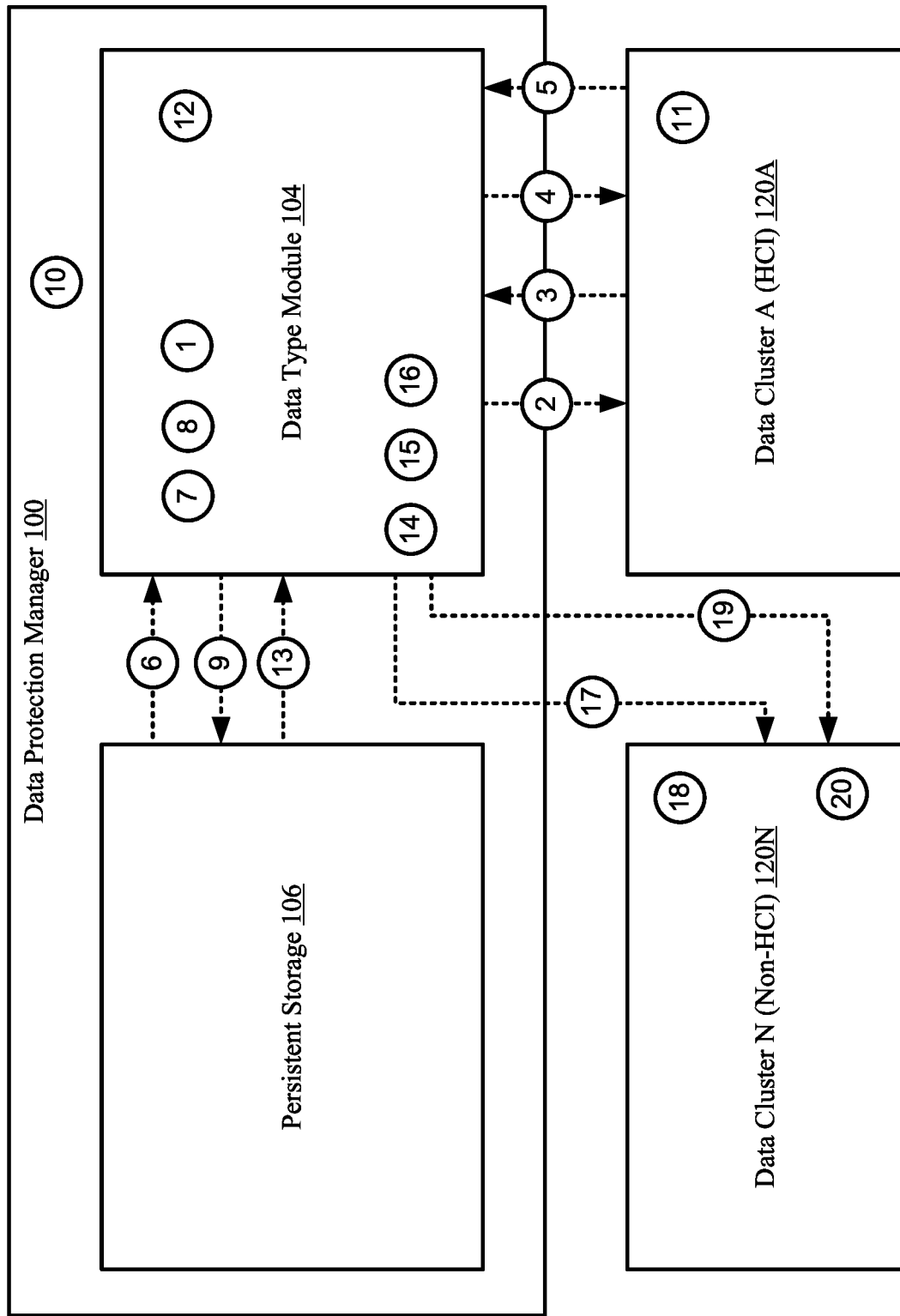
FIG. 6 shows a diagram of the operation of a fourth example system over time in accordance with one or more embodiments of the invention.

FIG. 6 shows a diagram of the operation of a fourth example system over time in accordance with one or more embodiments of the invention. Turning to FIG. 6, consider a scenario in which data cluster A (120A) is provisioned and has just registered with a data protection manager (100) and data cluster N (120N) has registered with the data protection manager but is currently not being used. Data cluster A (120A) includes a hyper-converged infrastructure and data cluster N (120N) includes a non-hyper-converged infrastructure. The data protection manager (100) includes a data type module (104) and a persistent storage (106). At step 1, the data type module (104) of the data protection manager (100) obtains a request to perform an initial discovery of data cluster components associated with data cluster A (120A). In response to obtaining the request to perform an initial discovery of data cluster components, at step 2, the data type module (104) sends a message to a data cluster manager (not shown) of data cluster A (120A). The message includes a request for currently deployed data cluster components of data cluster A (120A).

In response to obtaining the request, the data cluster manager generates and/or obtains data cluster component inventory information associated with data cluster A (120A). After generating and/or obtaining the data cluster component inventory information, at step 3, the data cluster manager sends the data cluster component inventory information to the data type module (104). At step 4, the data type module (104) sends a message to a data cluster manager (not shown) of data cluster A (120A). The message includes a request for data cluster topology information associated with data cluster A (120A).

In response to obtaining the request, the data cluster manager generates and/or obtains data cluster topology information associated with data cluster A (120A). After generating and/or obtaining the data cluster topology information at step 3, the data cluster manager sends the data cluster topology information to the data type module (104). At step 6, the data type module (104) obtains component data protection information. At step 7, the data type module (104) uses the data cluster component inventory information and the component data protection information to map protection policies to the data cluster components of data cluster A (120A) resulting in a first portion data cluster component protection policy mappings associated with data cluster A (120A). At step 8, the data type module uses the data cluster component inventory information and the component data protection information to map backup types to the data cluster components of data cluster A (120A) resulting in a second portion data cluster component protection policy mappings associated with data cluster A (120A).

The data cluster component inventory information specifies the data cluster components currently deployed in data cluster A (120A). The component data protection information specifies, for each type of component, a backup type recommended by each type of component by a manufacturer of the component or configured by a user of data cluster A (120A). The data type module (104) then, at step 9, (i) updates the data cluster component inventory repository stored in the persistent storage (106) with the data cluster component inventory information associated with data cluster A (120A), (ii) stores the data cluster component protection policy mappings associated with data cluster A (120A) (both the first portion and the second portion) in the persistent storage (106), and (iii) updates a data cluster topology information repository in the persistent storage (106) with the data cluster topology information associated with data cluster A (120A). At step 10, the data type module (104) initiates the performance of data protection services for the data cluster components of data cluster A (120A) based on the data cluster component protection policy mappings associated with data cluster A (120A).

At step 11, data cluster A (120A) fails. In response to the failure of data cluster A (120A), at step 12, the data type module (104) obtains a request to restore data cluster A (120A) using another data cluster. In response to obtaining the request to restore data cluster A, the data type module (104), at step 13, obtains data cluster topology information associated with all registered data clusters. At step 14, the data type module (104) uses the data cluster topology information associated with data cluster A (120A) and previously obtained data cluster topology information associated with data cluster N (120N) to identify data cluster N (120N) as the data cluster capable of restoring data cluster A (120A). After that, at step 15, the data type module identifies a dependency map based on the data cluster topology information associated with data cluster A (120) and the restoration request. Then, at step 16, the data type module (104) identifies a restoration sequence based on the dependency map and the data cluster topology information associated with data cluster A (120A).

At step 17, the data type module (104) sends a request to a data cluster manager (not shown) of data cluster N (120N) to initiate the restoration of data cluster A (120) using data cluster N (120N). In response to obtaining the request, at step 18, the data cluster manager of data cluster N (120N) provisions resources of data cluster N (120N) to perform the restoration. At step 19, the data type module sends a request to perform the restoration of data cluster A (120A). At step 20, the data cluster manager of data cluster N (120N) restores all of the data cluster components of data cluster A (120A) using the resources of data cluster N (120N).

End of Examples

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention relate to migrating data clusters to other data clusters that include heterogeneous infrastructures. To migrate data clusters, a data protection manager may obtain data cluster topology information associated with data clusters when mapping data protection services to data cluster components of the data clusters. The data cluster topology information may be used, along with data cluster inventory information, to identify potential data clusters to migrate a data cluster. The potential data clusters may include different data cluster infrastructures than the migrating data cluster. Therefore, data clusters may be efficiently migrated with minimal user involvement.

Thus, embodiments of the invention may address the problem of inefficient use of computing resources to migrate data clusters. This problem arises due to the nature of the technological environment in which the data clusters are operated.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the technology as disclosed herein. Accordingly, the scope of the invention should be limited only by the attached claims.

What is claimed is:

1. A method for managing data clusters, the method comprising:
   identifying, by a data protection manager, a migration event associated with a first data cluster;
   in response to identifying the migration event:
      identifying a second data cluster capable of hosting the first data cluster using data cluster topology information and data cluster component inventory information associated with the first data cluster;
      generating a dependency map associated with the second data cluster based on the first data cluster;
      identifying a migration sequence based on the dependency map;
      initiating data cluster components of the second data cluster to perform migration of the first data cluster; and
      migrating the first data cluster to the second data cluster.

2. The method of claim 1, wherein the first data cluster comprises a first data cluster infrastructure and the second data cluster comprises a second data cluster infrastructure, wherein the first data cluster infrastructure is difference than the second data cluster infrastructure.

3. The method of claim 1, wherein the dependency map specifies dependencies between data cluster components of the first data cluster.

4. The method of claim 3, wherein the migration sequence specifies an order associated with migration of data cluster components of the first data cluster to the second data cluster.

5. The method of claim 4, wherein the data cluster component inventory information specifies the data cluster components of the first data cluster.

6. The method of claim 5, wherein the data cluster topology information specifies capabilities and performance characteristics associated with the data cluster components of the first data cluster.

7. The method of claim 1, further comprising:
prior to identifying the migration event associated with the first data cluster:
identifying, by a mapping module of the data protection manager, a discovery event associated with the first data cluster;
in response to identifying the discovery event, by the mapping module:
obtaining the data cluster component inventory information associated with the first data cluster; and
obtaining the data cluster topology information associated with the first data cluster.

8. A non-transitory computer readable medium comprising computer readable program code, which when executed by a computer processor enables the computer processor to perform a method for managing data clusters, the method comprising:
identifying, by a data protection manager, a migration event associated with a first data cluster;
in response to identifying the migration event:
identifying a second data cluster capable of hosting the first data cluster using data cluster topology information and data cluster component inventory information associated with the first data cluster;
generating a dependency map associated with the second data cluster based on the first data cluster;
identifying a migration sequence based on the dependency map;
initiating data cluster components of the second data cluster to perform migration of the first data cluster; and
migrating the first data cluster to the second data cluster.

9. The non-transitory computer readable medium of claim 8, wherein the first data cluster comprises a first data cluster infrastructure and the second data cluster comprises a second data cluster infrastructure, wherein the first data cluster infrastructure is difference than the second data cluster infrastructure.

10. The non-transitory computer readable medium of claim 8, wherein the dependency map specifies dependencies between data cluster components of the first data cluster.

11. The non-transitory computer readable medium of claim 10, wherein the migration sequence specifies an order associated with migration of data cluster components of the first data cluster to the second data cluster.

12. The non-transitory computer readable medium of claim 11, wherein the data cluster component inventory information specifies the data cluster components of the first data cluster.

13. The non-transitory computer readable medium of claim 12, wherein the data cluster topology information specifies capabilities and performance characteristics associated with the data cluster components of the first data cluster.

14. The non-transitory computer readable medium of claim 8, wherein the method further comprises:
prior to identifying the migration event associated with the first data cluster:
identifying, by a mapping module of the data protection manager, a discovery event associated with the first data cluster;
in response to identifying the discovery event, by the mapping module:
obtaining the data cluster component inventory information associated with the first data cluster; and
obtaining the data cluster topology information associated with the first data cluster.

15. A system for managing data protection services for data clusters, the system comprising:
persistent storage for storing a data cluster topology information repository;
a data protection manager, comprising a processor and memory, configured to:
identify a migration event associated with a first data cluster;
in response to identifying the migration event:
identify a second data cluster capable of hosting the first data cluster using data cluster topology information and data cluster component inventory information associated with the first data cluster;
generate a dependency map associated with the second data cluster based on the first data cluster;
identify a migration sequence based on the dependency map;
initiate data cluster components of the second data cluster to perform migration of the first data cluster; and
migrate the first data cluster to the second data cluster.

16. The system of claim 15, wherein the first data cluster comprises a first data cluster infrastructure and the second data cluster comprises a second data cluster infrastructure, wherein the first data cluster infrastructure is difference than the second data cluster infrastructure.

17. The system of claim 15, wherein the dependency map specifies dependencies between data cluster components of the first data cluster.

18. The system of claim 17, wherein the migration sequence specifies an order associated with migration of data cluster components of the first data cluster to the second data cluster.

19. The system of claim 18, wherein the data cluster component inventory information specifies the data cluster components of the first data cluster.

20. The system of claim 19, wherein the data cluster topology information specifies capabilities and performance characteristics associated with the data cluster components of the first data cluster.

* * * * *